United States Patent [19]

DeVoy et al.

[11] 3,803,560

[45] Apr. 9, 1974

[54] TECHNIQUE FOR DETECTING MEMORY FAILURES AND TO PROVIDE FOR AUTOMATICALLY FOR RECONFIGURATION OF THE MEMORY MODULES OF A MEMORY SYSTEM

[75] Inventors: David D. DeVoy, Dedham; George J. Barlow, Tewksbury, both of Mass.

[73] Assignee: Honeywell Information Systems Inc., Waltham, Mass.

[22] Filed: Jan. 3, 1973

[21] Appl. No.: 320,790

[52] U.S. Cl. ........................ 340/172.5, 235/153 AK

[51] Int. Cl. ............................................ G06f 11/00

[58] Field of Search ....... 340/172.5, 146.1; 235/153

[56] References Cited

UNITED STATES PATENTS

| | | | |
|---|---|---|---|
| 3,386,082 | 5/1968 | Stafford | 340/172.5 |
| 3,641,505 | 2/1972 | Artz et al. | 340/172.5 |
| 3,560,935 | 2/1971 | Beers | 340/172.5 |
| 3,581,286 | 5/1971 | Beausoleil | 340/172.5 |
| 3,226,689 | 12/1965 | Amdahl et al. | 340/172.5 |
| 3,609,704 | 9/1971 | Schurter | 340/172.5 |
| 3,517,171 | 6/1970 | Avizienis | 235/153 |
| 3,665,418 | 5/1972 | Bouricius et al. | 340/172.5 |

*Primary Examiner*—Paul J. Henon
*Assistant Examiner*—Mark Edward Nusbaum
*Attorney, Agent, or Firm*—Faith F. Driscoll; Ronald T. Reiling

[57] ABSTRACT

Apparatus included within a memory system which comprises a plurality of memory modules is operative in response to command signals to remove automatically modules detected as faulty during system operation and to reconfigure the remaining modules to form a continuous address space.

25 Claims, 23 Drawing Figures

PATENTED APR 9 1974 3,803,560

SHEET 02 OF 16

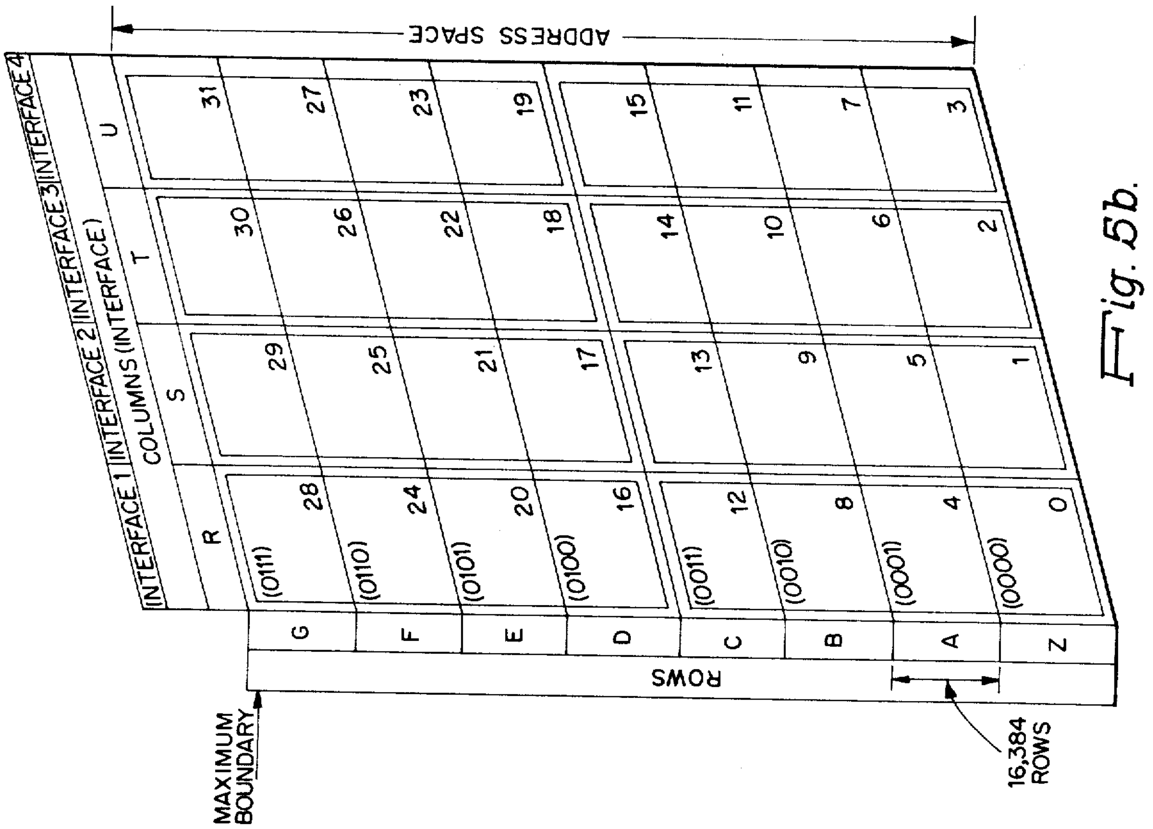
ADDRESS SPACE
INTERFACE 1
INTERFACE 2
INTERFACE 3
INTERFACE 4
COLUMNS (INTERFACE)
ROWS
MAXIMUM BOUNDARY
16,384 ROWS
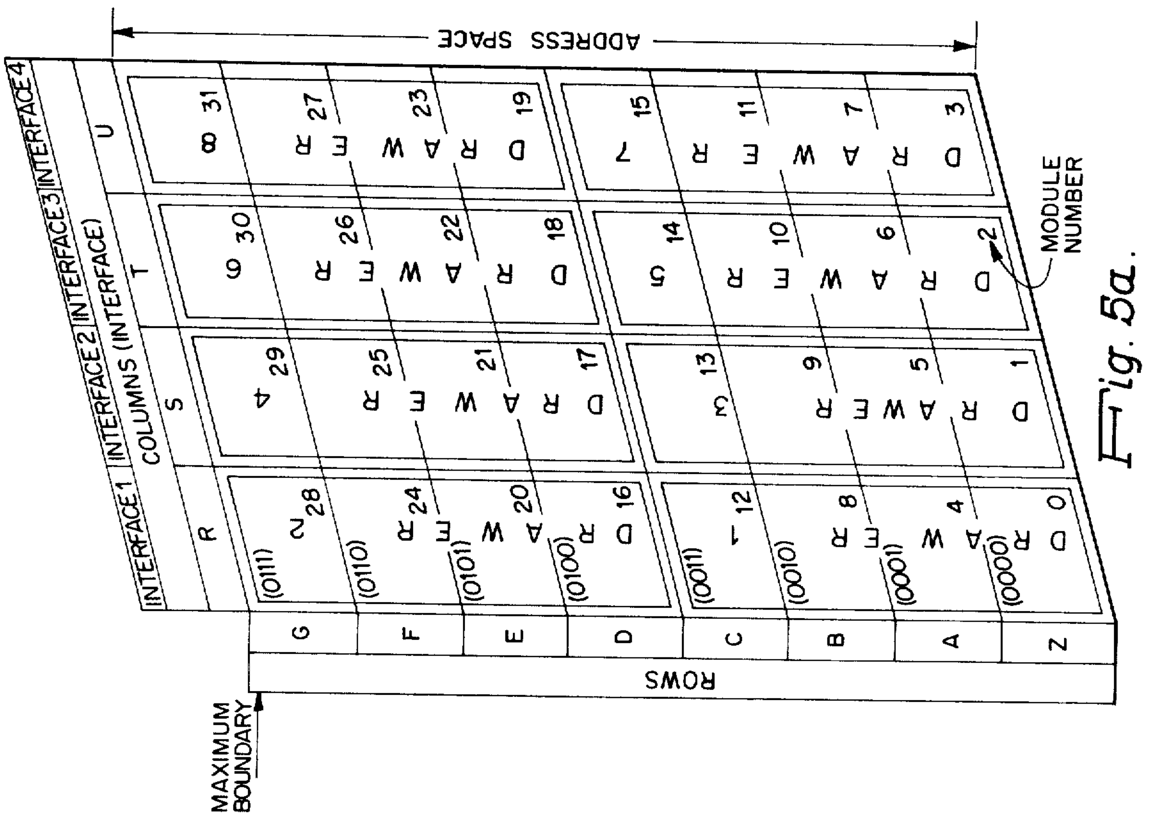
ADDRESS SPACE
INTERFACE 1
INTERFACE 2
INTERFACE 3
INTERFACE 4
COLUMNS (INTERFACE)
ROWS
MAXIMUM BOUNDARY
MODULE NUMBER

TECHNIQUE FOR DETECTING MEMORY FAILURES AND TO PROVIDE FOR AUTOMATICALLY FOR RECONFIGURATION OF THE MEMORY MODULES OF A MEMORY SYSTEM

BACKGROUND OF THE INVENTION

1. Field of the Invention

This invention relates to memory systems and more particularly to techniques for facilitating the maintenance of memory systems.

2. Prior Art

Some prior art computer systems have employed arrangements for changing the configuration of constituent physical units in modular computer systems by adding and removing storage modules from the system for maintenance purposes. In these systems, manual switches are used to either partition the system into separate isolated subsystems or to provide means for modifying the address assignment at the memory modules so that the module could have maintenance performed without disabling the system.

While the above prior art systems provide means for reconfiguring system for testing without disturbing normal computer operations, such systems still require that the system configuration be established by an operator through the use of manual switches. Thus, these systems are susceptible to operator errors caused by inadvertent operator selections. Furthermore, the prior art systems cannot provide means for automatically isolating faulty modules and automatic switching of all such modules off-line for subsequent testing or replacement without disturbing the operation of the rest of the system.

Other prior art systems have enabled the reconfiguration of certain physical modules by the employment of redundant or duplicate modules. Normally, when a failure occurred, an operator would substitute the duplicate modules. These systems are costly in that the modules or units duplicated have been major system components. Also, the operator is again required to initiate the module interchange which subjects the process to errors produced by inadvertent selections.

Accordingly, it is an object of the present invention to provide apparatus for use in a data processing system wherein one or more of a plurality of faulty memory modules comprising a memory system of the system can be automatically purged from the system enabling immediate recovery of the system.

It is a further object of the present invention to provide a technique for automatic reconfiguration the remaining memory modules of the memory system to form a new continuous address space.

It is a more specific object of the present invention to provide apparatus which enables an operator to initiate automatic reconfiguration of the available memory resources of a system to form a continuous address space.

It is a furthermore specific object to provide apparatus for enabling the automatic removal of faulty memory modules from a memory system and the addition of spare modules for maintaining a desired amount of addressable memory space.

SUMMARY OF THE INVENTION

The above objects of the present invention are achieved in a preferred embodiment which provides a memory system including a plurality of memory modules. The apparatus of the invention includes address positioning apparatus for each module which designates an address used for accessing the module and means for sensing that the modules meet a minimum standard of reliability during operation. In the preferred embodiment, the last mentioned means senses each occurrence of an error in the formation being accessed from the memory system. Thus, the standard employed for reliability in the preferred embodiment is based upon the integrity of the information to be accessed. The address positioning apparatus of the modules are connected in tandem so that the address positioning apparatus of one module operative to modify address signals received from the address positioning apparatus of a previous module applies the modified address signals to the address positioning apparatus of a succeeding module. Additionally, each of the address positioning means applies the modified address signals it generates to its associated module to be used in accessing the module. Upon receipt of a command signal, the sensing means causes each of the modules sensed having as an error condition to be inhibited from responding to address signals applied from the central processing unit. This is effective to disconnect logically the bad modules from the system. Additionally, the sensing means causes the address positioning means of each bad module to be inhibited from modifying the address signals applied to its input which are transferred to a positioning unit of a succeeding module thereby altering automatically the address signals applied to the remaining memory modules to form a new continuous address space.

The removal of a faulty module also causes the address positioning apparatus of a last memory module to generate address signals indicative of the number of modules which are presently operative. That is, the address signals generated by the address positioning of the last module which correspond to the maximum number of modules in the system are reduced in numerical value by the number of faulty modules. These signals are transmitted to the central processing unit.

The central processing unit uses the module number address signals received from the positioning apparatus of the last module to establish the maximum boundary of addressable memory within the system. When the central processing unit attempts to access a word storage location above that maximum boundary established, this causes apparatus within the central processing unit to generate an appropriate check signal.

In a preferred embodiment, the memory system comprises a combination of small memory modules. In accordance with the invention, a small increment of memory is selected for the module size because it has the advantage of losing less memory space in the event of failure. Since the memory size has a direct effect on system performance especially in a multiprogramming environment, the degradation in memory performance is also maintained relatively small in the event of a memory failure. Further advantages that come about with the use of small memory modules are described in an article titled "A Case for Increasing the Modularity of Large Performance Digital Memories" by David D. DeVoy and Dana W. Moore which appears in the Honeywell Computer Journal, Volume 5, No. 2, published in 1971.

Additionally, the invention provides for automatic addition of a spare memory module during reconfiguration thereby providing the user with the advantage of being able to retain the same address space notwithstanding a module failure. This is accomplished by including means for establishing a predetermined module number for the system which conditions the address positioning apparatus of the spare memory module to be enabled for operation when this number is less than the predetermined module number.

A further advantage of the spare module arrangement is that in multicharacter interleaved systems such as that described in the above article, a failure of a single module will enable interleaving to the same extent it was before the failures. Since a small increment of memory is selected for the module size, the cost of including the spare module capability minimizes the cost of adding modules to the system for this purpose.

The above and other objects of this invention are achieved in an illustrative embodiment described hereinafter. All features which are believed to be characteristic of the invention, both as to its organization and method of operation together with further objects and advantages thereof will be better understood from the following description considered in connection with the accompanying drawings. It is to be expressly understood, however, these drawings are for the purpose of illustration and description only and are not intended as a definition of the limits of the invention.

BRIEF DESCRIPTION OF THE DRAWINGS

FIGS. 5*a* through 5*h* show the address space provided by the memory system of FIG. 1 under certain specified conditions.

DESCRIPTION OF THE PREFERRED EMBODIMENT

System

Figure 1:
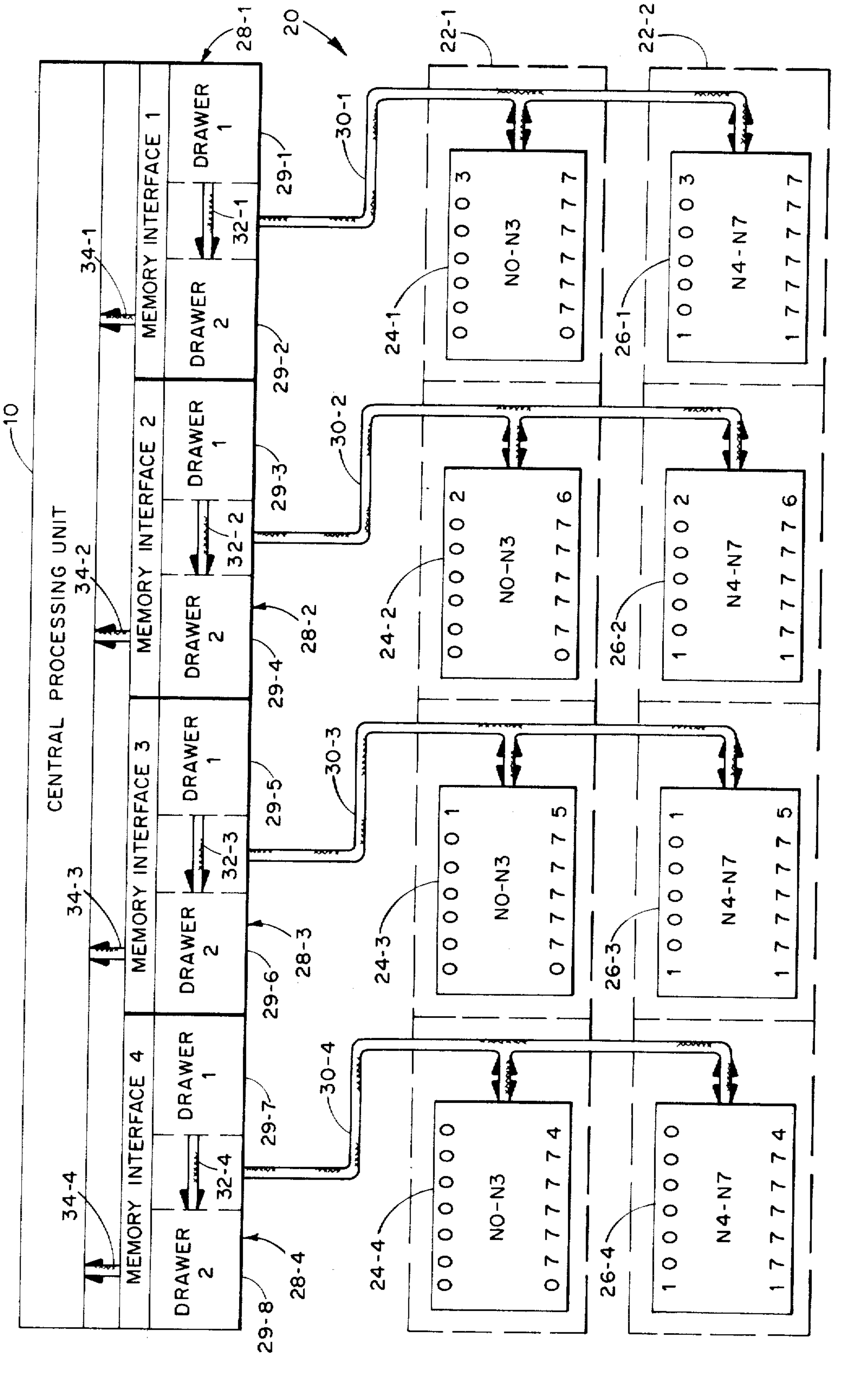
FIG. 1 shows in block diagram form a system which incorporates the present invention.

Referring to FIG. 1, there is shown in block diagram form a data processing system which includes the apparatus of the present invention. As shown, the system includes a variable length character processor 10, conventional in design, and a main memory system 20. For example, the processor 10 may take the form of the central processing unit (CPU) described in U.S. Pat. No. 3,331,056 to Michael M. Blume and Walter L. Lethin assigned to the assignee named herein.

The main memory system 20 is organized so as to include two rows of memory banks 22-1 and 22-2. The memory bank 22-1 includes physical groups of four memory modules 24-1 through 24-4 and the memory bank 22-2 includes the units 26-1 through 26-4. Each of the banks provides a total of 65,536 36-bit words of addressable memory space. Each unit includes four character wide memory modules which provide a total of 65,536 9 bit characters of addressable memory space in increments of 16,384 characters. In each column, each group of memory modules Nϕ through N7 are independently operated by timing and control circuits included in different ones of the drawers 29-1 through 29-8 included in memory interface 28-1 through 28-4 as shown.

Each interface communicates with the processor 10 through one section of a 36 bit memory local register, not shown. Each interface enables the access of one character location of a designed one of the memory modules of a drawer. That is, the memory interface for a column provides the drawers included therein with necessary input timing, address, information and control signals for addressing a character storage location within one of the modules N0-N7 via a set of conductors included in a corresponding one of the buses 30-1 through 30-4 and for reading out its contents to another set of conductors included in the same bus during a read cycle of operation. During a write cycle of operation, instead of writing the same contents read into the storage location, information applied along another set of conductors is written into the addressed storage location. This arrangement permits the character processor 10 to access up to four characters simultaneously in addition to reducing the effective memory access time per character. In accordance with the invention, the modules of a first drawer within each interface supply the modules of the next drawer with module number address information signals via a corresponding one of the cables 32-1 through 32-4. The module number signals are also routed from the last module of each column (i.e., module N7) to the CPU 10 via a corresponding one of the cables 34-1 through 34-4. This enables the CPU 10 to detect when the address signals exceed the maximum memory address space available.

Figure 2:
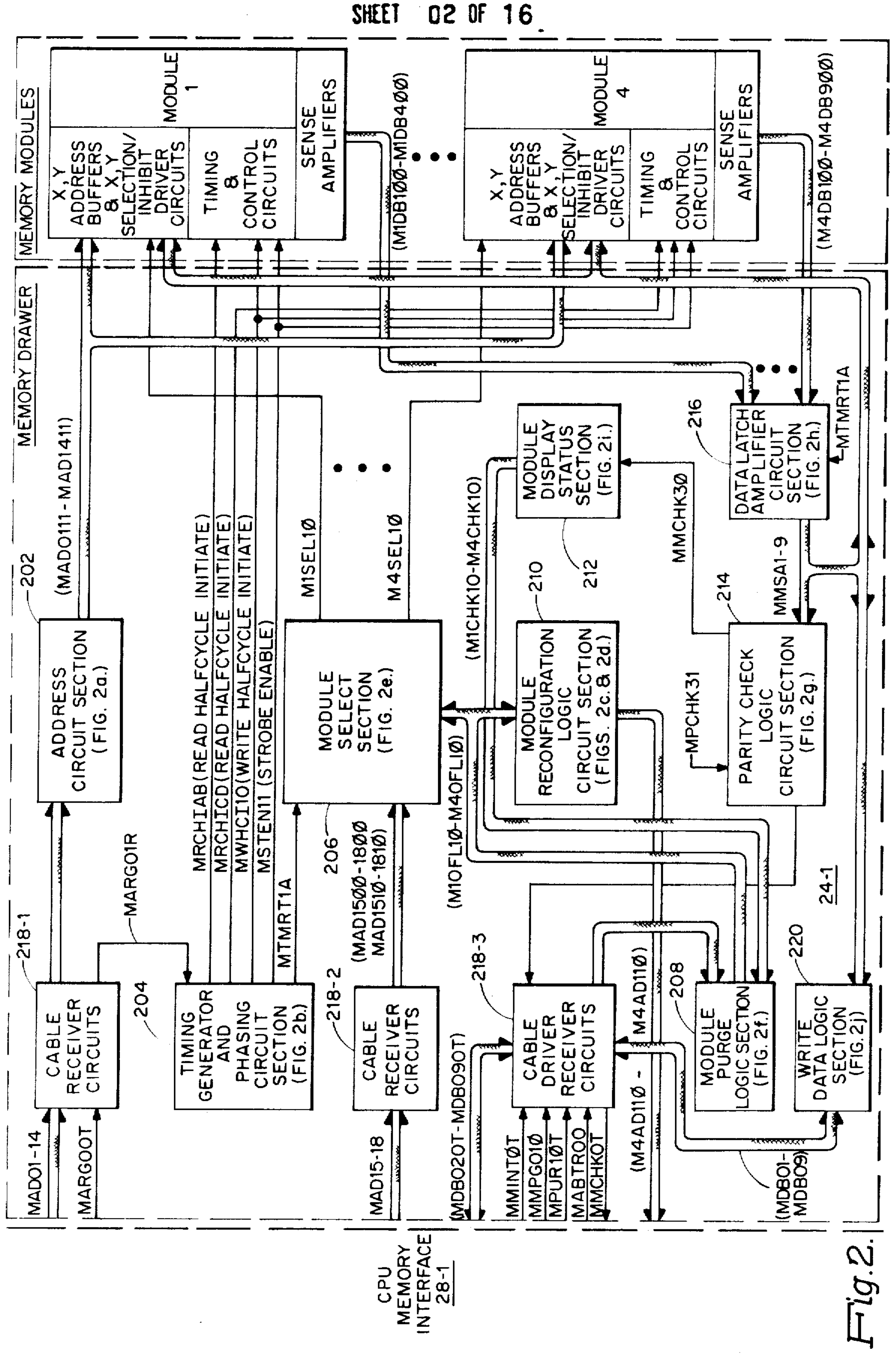
FIG. 2 shows in greater detail, portions of the memory interface circuits of FIG. 1.

FIG. 2 shows in block diagram form the elements included within the memory drawer 29-1 of FIG. 1 which comprise the apparatus of the present invention in addition to those elements which control the normal operation of a group of four modules. The remaining drawers 29-2 through 29-8 include circuit arrangements similar to that of the drawer 29-1 and for that reason are not described further herein.

As seen from FIG. 2, the Memory Drawer Interface 29-1 includes as major components, the sections 202 through 216 arranged as shown. The various timing signals, control signals, address signals and data signals are transferred between the drawer 29-1 and the CPU 10 by conventional cable driver-receiver circuits included within the blocks 218-1 through 218-3. The timing signals, selection signals, address signals and data signals are transferred between the memory drawer 24-1 and various sections of the four memory modules of the drawer as shown in FIG. 2.

Each of the modules N0 through N3 comprise a coincident current core memory in the form of two 8,192 9-bit character stacks, conventional in design. Also, each memory module includes timing and control circuits, address buffer circuits, selection circuits, sense amplifier circuits, inhibit circuits and interface circuits required for accessing one of 16,358 9 bit character storage locations for either writing a 9 bit data character into or reading a 9 bit data character from an addressed character storage location.

In the preferred embodiment of the present invention, each of the four memory modules N0 through N3 of FIG. 2 are individually associated with one of a corresponding number of positioning units 210-1 through 210-1*d* included in block 210. During a normal operation, each positioning unit operates to generate a logical address for designating its associated module and for accessing the module. As explained in greater detail herein, each positioning unit generates the logical address by modifying a set of address signals applied to its input terminals and applying the modified address signals to a set of output terminals. The positioning units of the modules are connected in tandem so that the positioning unit of one module modifies the address signals received from the positioning unit of a previous module and applies the modified address signals to the positioning unit of a succeeding module. In the embodiment, the positioning unit of module 1 receives a set of predetermined address which the unit uses to generate the first logical address. The positioning unit of module 4 applies the address signals at its set of output terminals to either the CPU or to another positioning unit as explained.

Additionally, each of the positioning units applies the modified address signals to its associated module to be used in accessing the module. Specifically, the modified address signals are applied to a corresponding one of a plurality of module select circuits included within block 206 of FIG. 2. Each of these circuits as explained herein is operative to condition its associated module for access when designated by the four high order address bits of the 16 bit address code generated by the CPU. The circuits included within the block 214 are operative to sense whether each of the memory modules meet a minimum standard of reliability by performing a parity check upon the information accessed from each of the modules. Upon the occurrence of an error, the circuits of block 214 switch one of the storage circuits included within section 212. When it becomes desirable to "purge" the system of faulty modules, a command signal conditions logic circuits included within block 208 to apply control signals to the positioning units of each of the modules designed by the section 212 as being faulty. These signals inhibit each of the positioning units from modifying the address signals applied to their input terminals. The same control signals are also applied to the module select circuits of block 206 and inhibit them from responding to the address signals applied from the CPU.

ADDRESS CIRCUIT SECTION 202

Figure 2A:
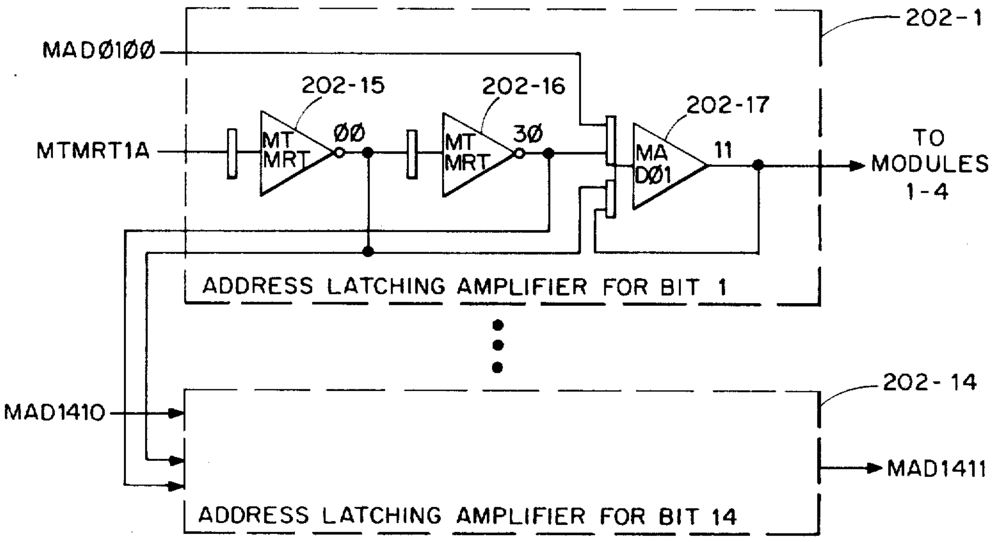
FIG. 2*a* shows in greater detail the circuits of the Address Circuit Section of FIG. 2.

Considering the sections of FIG. 2 in greater detail, it is seen from FIG. 2*a* that the Address Circuit Section 202 includes a number of storage circuits 202-1 through 202-14, each of which includes a latching amplifier circuit similar to that of circuit 202-17. Each latch circuit is arranged to store one bit of the 14 low order address bits received from the CPU 10. As shown in FIG. 2, the output signal MAD0111 through MAD1411 of the latching circuits of circuits 202-1 through 202-14 are fed in parallel to each of the four modules for accessing the contents of a character storage location within a selected memory module.

Consider the operation of storage circuit 202-1. The latch amplifier circuit 202-17 switches to a binary ONE when an input data signal MAD01ϕϕ and timing signal MTMRT3ϕ are both binary ONES. The circuit 202-17 is held in a binary ONE state by holding signal MTMRTϕϕ until a timing signal MTMRT1B is again forced to a binary ONE. The signal MTMRT1B when a binary ONE conditions a gate inverter circuit 202-15 to force hold signal MTMRTϕϕ to a ZERO and a further gate inverter 202-16 to force signal MRT3ϕ to a binary ONE. Conversely, when signal MAD01ϕϕ is a binary ZERO, latch circuit 202-17 if a binary ONE switches to a binary ZERO state when signal MTMRT1B is forced to a binary ONE.

TIMING GENERATOR AND PHASING CIRCUIT SECTION 204

Figure 2F:
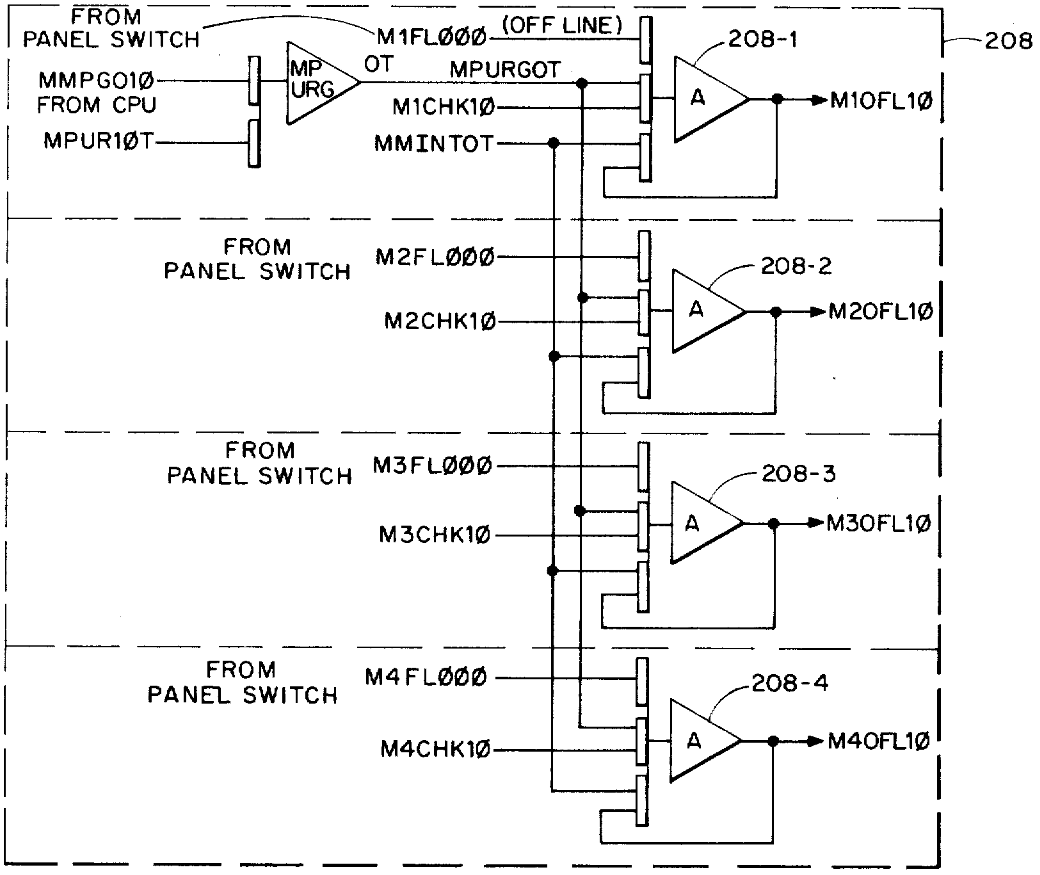
FIG. 2*f* shows in greater detail the circuits of the Module Purge Logic Section of FIG. 2.
Figure 2B:
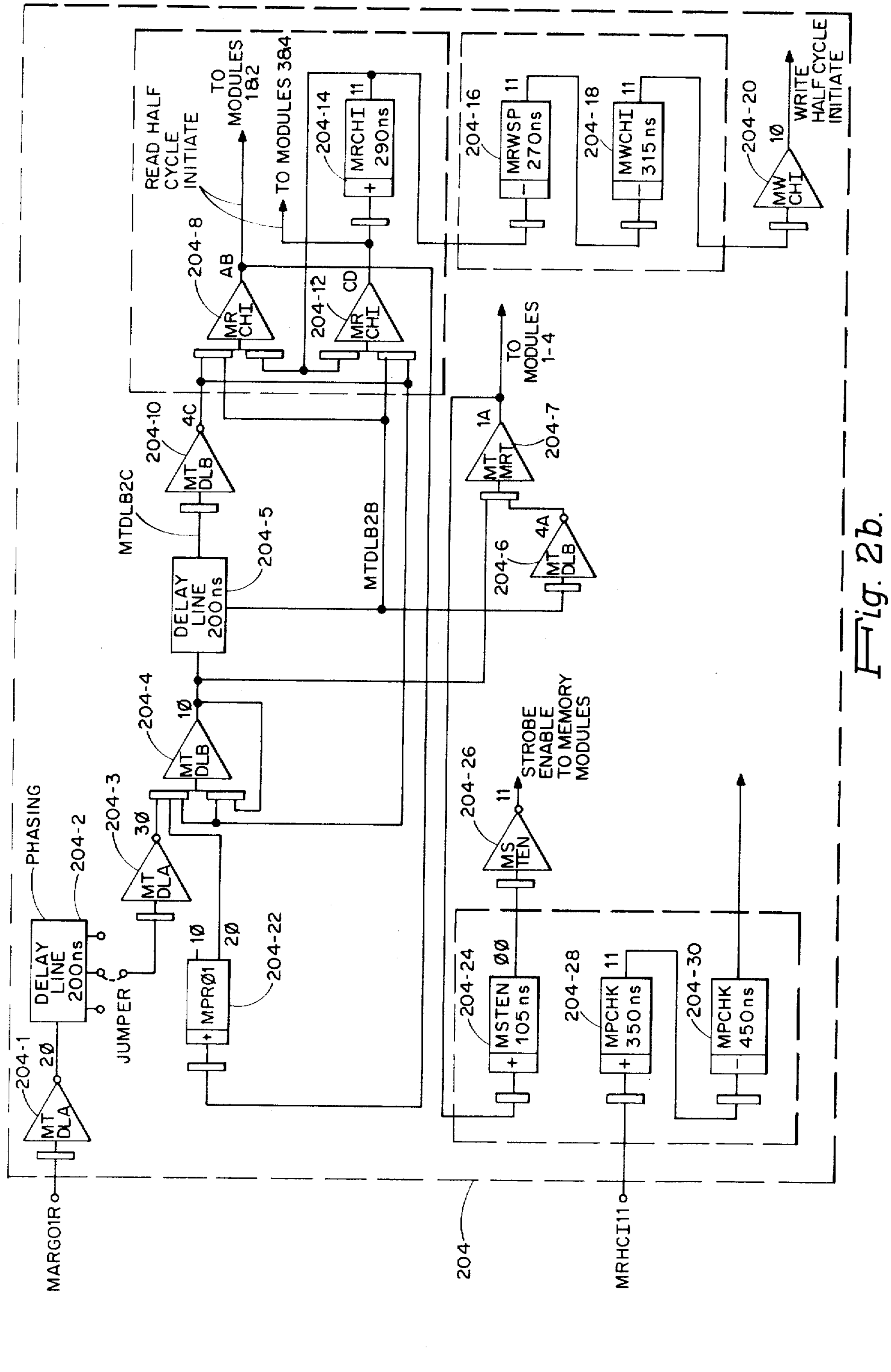
FIG. 2*b* shows in greater detail the circuits of the Timing Generator and Phasing Circuit Section of FIG. 2.

The timing signal MTMRT1A, as other signals, is derived from Timing Generator and Phasing Circuit Section 204 which is shown in greater detail in FIG. 2b. This section provides the basic timing signals for each of the memory modules during a read or write cycle of operation in response to an input timing signal MARG01R generated by CPU 10.

Normally, signals MTDLA3ϕ, MTDLB1ϕ, MTDLB2B and MTDLB3C are binary ZEROS. When signal MARG01R is forced to a binary ONE, signal MTDLA2ϕ is forced from a binary ONE to a binary ZERO. This change of state in signal MTDLA2ϕ is delayed by a predetermined amount by a delay line 204-2 and is then applied to a gate inverter circuit 204-3. After the delay, an inverter circuit 204-3 forces signal MTDLA3ϕ to a binary ONE which forces a latch circuit 204-4 to switch signal MTDLB1ϕ to a binary ONE. Signals MPR012ϕ and MTDLB4C are both ONES at this time. Since signal MTDLB4A is normally a binary ONE, a gate amplifier circuit 204-7 is enabled by signals MTDLB4A and MTDLB1ϕ and forces to binary ONE a set-reset signal MTMRT1A which is applied to the address and data latch circuits respectively of FIGS. 2*a* and 2*h*. When signal MTMRT1A switches to a binary ONE, it triggers a strobe one shot circuit 204-24 in turn forcing signal MSTEN11 to a ZERO. This signal is applied to all memory modules to signal the start of a memory cycle. When signal MTMRT1A switches from a binary ZERO to a binary ONE, it conditions the address circuits of FIG. 2*a* to accept new address bits for storage therein. At the same time, signal MTMRT1A resets the date latching circuits of FIG. 2*h* to their binary ZERO states.

The change of state in signal MTDLB1ϕ is delayed by a second delay line 204-5 after which it forces signal MTDLB2B from a ZERO to a binary ONE. This signal enables gates 204-8 and 204-12 switching signals MRCHIAB and MRCHICD to binary ONES. The change in state in signal MRCHICD triggers a one shot circuit 204-14 which provides a 290 nanosecond pulse signal, MRCHI11. The output terminal of the one shot circuit 204-14 connects back to an input terminal of each of the gates 204-8 and 204-12 to apply signal MRCHI11 which establishes the duration that signals MRCHIAB and MRCHICD remain binary ONES. The signals MRCHIAB and MRCHICD are applied to memory modules A through D and determine the duration of the read portion of the memory cycle.

When signal MRCHIAB switches to a binary ONE, it triggers an one shot circuit 204-22. The negation of the signal from circuit 204-16 prevents the setting of latch 204-4 and holds the latch circuit in its state until the initiation of a next memory cycle. At the end of 200 nanoseconds, signal MTDLB4C is forced to a ZERO resetting latch circuit 204-4 to a ZERO.

When one shot circuit 214-14 fires, it triggers a first parity check one shot circuit 204-28 which after 350 nanoseconds then fires a further series connected parity one shot circuit 204-30. The 450 nanosecond signal MPCHK31 establishes the time interval during which a parity check is performed upon the data read from a selected one of the memory modules during a memory cycle. Following the 290 nanosecond time interval established by one shot circuit 204-14, a pair of series connected one shot circuits 204-16 and 204-18 trigger in succession in turn producing a write command signal MWHCI10. This signal is forwarded to all memory modules and establishes the write interval of a memory cycle.

MODULE RECONFIGURATION LOGIC CIRCUIT SECTION 210

Figure 2C:
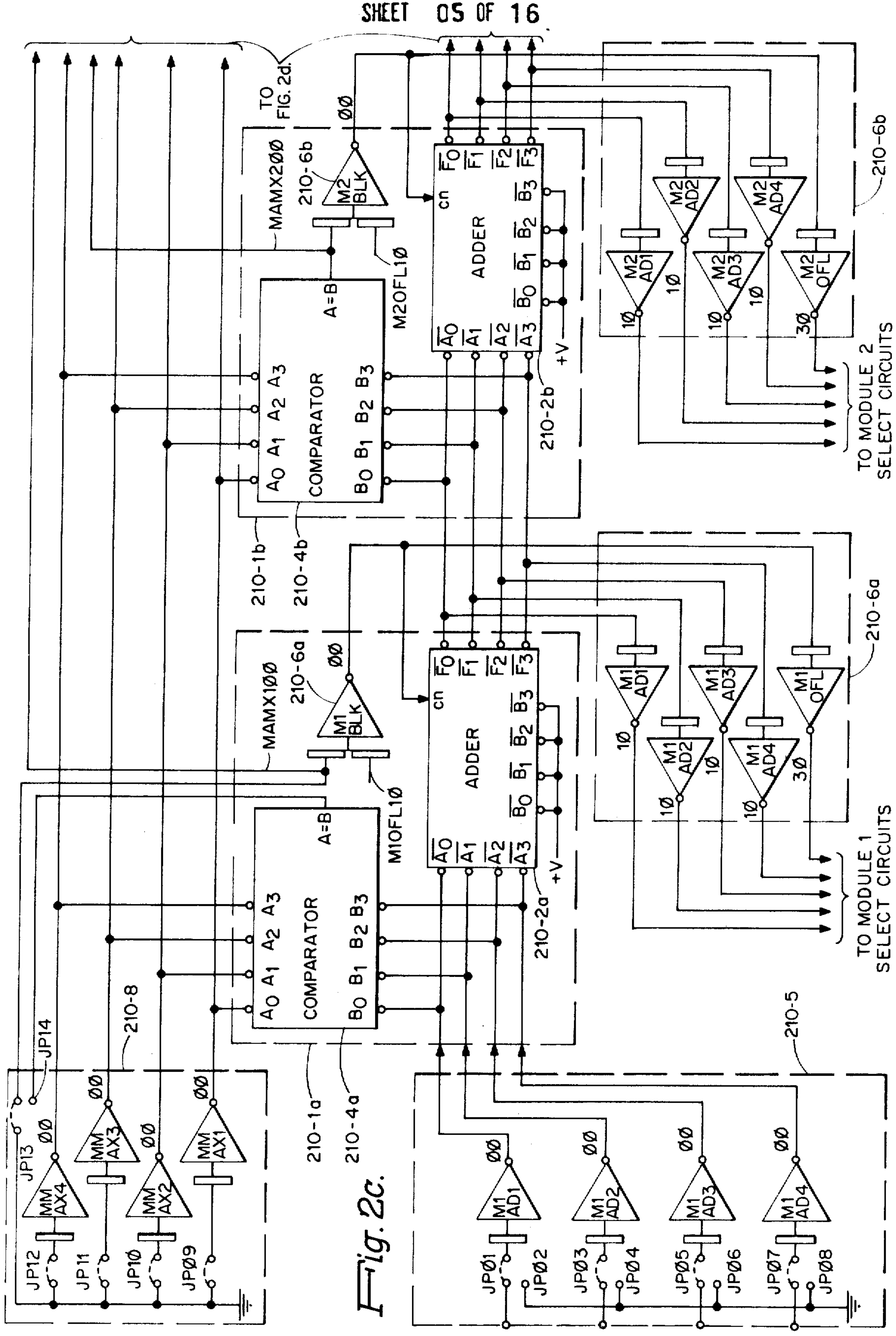
FIGS. 2*c* and 2*d* show in greater detail the circuits of the Module Reconfiguration Logic Circuit Section of FIG. 2.

The section, as seen from FIGS. 2*c* and 3*d*, includes the positioning units 210-1*a* through 210-1*d* for each of the memory modules 1 through 4. Specifically, the units of each memory module connect in tandem as shown, and exclusive of the first each unit defines the address assigned to the next unit in the series in the manner described herein. Also, as shown, the output terminals F0 through F3 of each positioning units are coupled through a corresponding one of the groups of inverter circuits of blocks 216-1*a* through 216-1*d* to the Module Select Section of FIG. 2*e*.

Each of the positioning units 210-1*a* through 210-1*d* include an adder circuit and a comparator circuit arranged as shown. Each of these circuits 210-4*a* through 210-4*d* and 210-*a* through 210-2*d* are conventional in design. For example, the adder and comparator circuits may take the form of the arithmetic logic units designated as SN74181 described at pages 9–315 through 9–320 of a manual titled "TTL Integrated Circuits Catalog" published by Texas Instruments Incorporated and dated 1971.

Figure 2D:
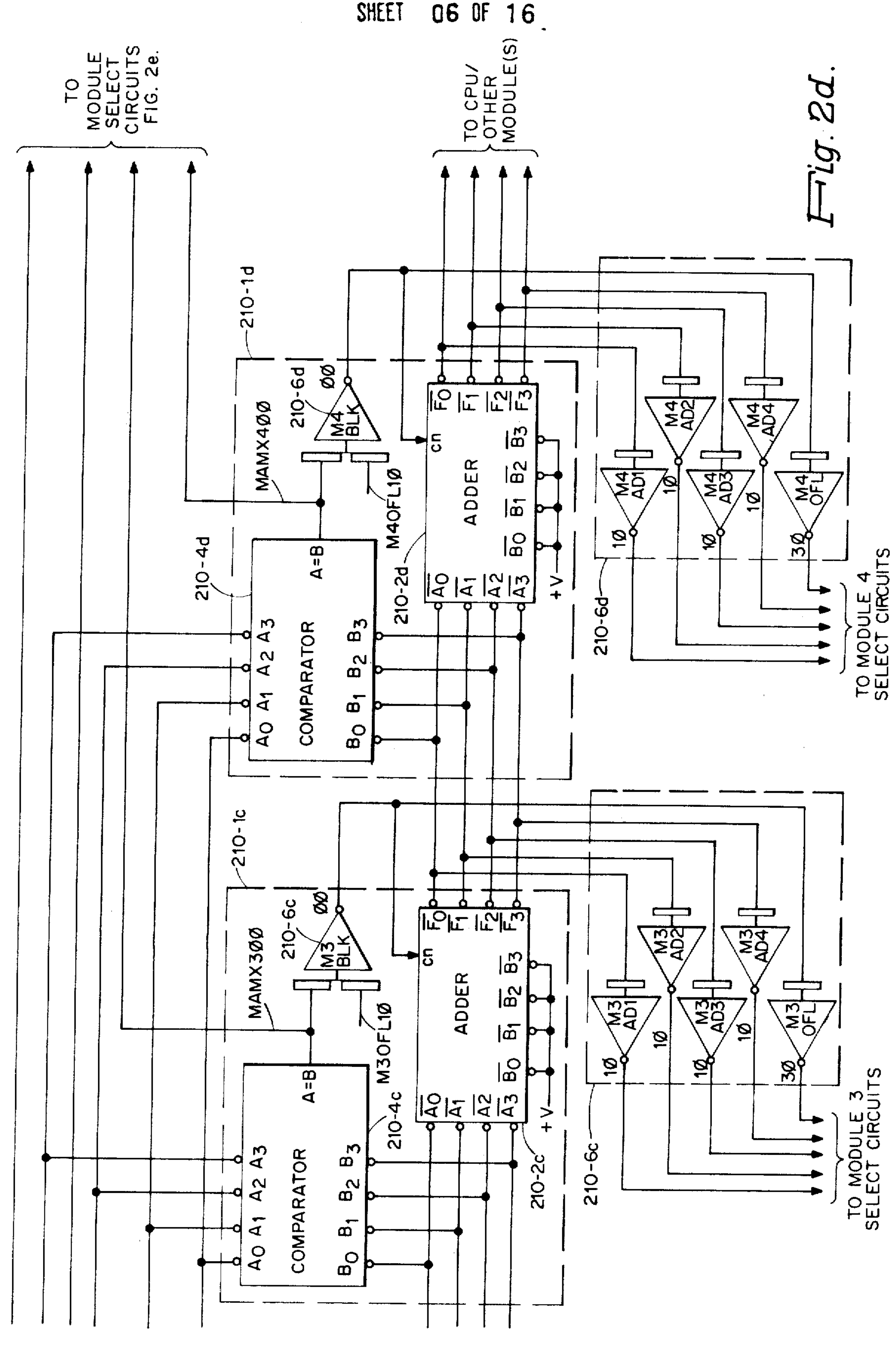

In the arrangement shown in FIGS. 3*c* and 2*d*, the arithmetic logic units for the adder circuits are arranged to operate arithmetically upon the two sets of input signals. The same units are used as comparator circuits which are arranged to perform a logical comparison operation upon two sets of input signals and thus operate as conventional comparator circuits. The circles at the terminals of the adder and comparator circuits designate that an inverting or complementing operation is performed upon the signals applied to those terminals. This makes the internal operation of these circuits compatible with the input signals as explained in greater detail herein.

As shown in FIGS. 2*c* and 2*d*, each of the comparator circuits 210-4*a* through 210-4*d* receive one set of input digital address signals from jumper and inverter circuits included within a block 212. The jumpers JPϕ9 through JP12 are wired to establish the maximum allowable address that any module can have or, stated differently, the maximum number of memory modules which can be operated within a memory interface. More particularly, each of the comparator circuits 210-4*a* through 210-4*d* compare the maximum allowable established bit pattern signals applied to terminals A0 through A3 with a second predetermined group of address signals derived from jumpers JPϕ1 through JPϕ8 which are inverted by inverter circuits included within a block 214 and applied to the terminals B0 through B3 of the adder circuit. The second group of address signals represent the number of modules at a particular point within the memory interface that are operational at that time.

The results of the comparison performed by each comparator circuit determines whether the adder circuit associated therewith is to modify or add one to the sum obtained by adding the address bit patterns applied to its pair of input terminals A0 through A3 and B0 through B3. The second group of adder input terminals B0 through B3 are each connected to receive a positive voltage representative of binary ONE. Since the signals applied to these terminals are inverted, the inputs B0 through B3 of each adder apply a fixed address corresponding to an all zero bit pattern as a second quantity to be operated upon arithmetically by the adder circuit.

In the absence of a true comparison from any one of the comparator circuits 210-4*a* through 410-4*d*, each of the signals M1BLKϕϕ through M4BLKϕϕ generated by inverter circuits 210-6*a* through 210-6*d* are normally binary ONES. Accordingly, each adder circuit produces at its output terminals F0 through F3 signals of the sum of the address bit patterns applied to input terminals A0 through A3 and B0 through B3. The sum corresponds to the address bit pattern applied to its input terminals A0 through A3 incremented by one since the inputs B0 through B3 of each adder circuit are set to the pattern 000. Whenever a comparator circuit senses a true comparison, it forces a corresponding one of the signals MAMX1ϕϕ through MAMX4ϕϕ to a binary ONE which in turn forces one of the signals M1BLKϕϕ through M4BLKϕϕ to a ZERO. With no carry input signal, each adder produces a sum at terminals F0 through F3 which corresponds to the address bit pattern applied to its input terminals A0 through A3. The sum is in turn applied as an input to the adder of the next positioning device. At the same time, the positioning unit forces a corresponding one of the signals M10FL3ϕ through M40FL3ϕ to a state which inhibits the Module Select Circuits of FIG. 2*e* from responding to the address selection signals applied via the circuits of blocks 210-6*a* through 210-6*d*.

By preventing an adder from modifying the input signals applied to terminals A0 through A3 and having it inhibit the selection circuits, this effectively disconnects the associated module from the system. The same module disconnecting operation described also occurs whenever any one of the signals M10FL1φ if forced to a binary ONE. These signals are generated by the Module Purge Logic Circuit Section of FIG. 2 in accordance with certain checking criteria described herein and initiate automatically the reconfiguration of the memory system of FIG. 1 as required.

Briefly, the normal operation of the Module Reconfiguration Logic Circuit Section 210 will now be described by considering several examples. It should be noted that the comparator and adder circuits of blocks 210-1*a*, 210-1*b*, 210-1*c*, and 210-1*d* operate on negative logic are such that a binary ONE is equal to a zero volt signal and a binary ZERO is equal to a positive voltage signal. The only exceptions to this are the signal A = B at the output terminal of the comparator circuit and the Cn signals at the input terminal to the adder circuit. Therefore, all references to binary bit pattern signals entering or leaving these circuits, excepting the signals applied to terminals A = B or Cn will be expressed in terms of negative logic (i.e., when a gnd = binary ONE and a positive signal = binary ZERO). The circuits of blocks 212 and 214 are inverter circuits which convert the signals applied to the comparator and adder circuits from positive logic (i.e., where a binary ZERO = zero volts gnd and a binary ONE = positive voltage) to negative logic for input to the comparator and adder circuits. The circuits of blocks 210-6*a*, 210-6*b*, 210-6*c*, and 210-6*d* are inverter circuits used to convert the signals from the positive logic compatible with the remainder of the system.

It is assumed that modules 1 is the first module within the subsystem and thus the module through its positioning device 210-1*a* is assigned an address of 0000. Since this address corresponds to the input address incremented by one, jumpers JPφ1 through JPφ8 are not connected for use so as to provide an input address of 1111 to the adder circuit 210-2*a*. The memory modules 2, 3 and 4 through their respective positioning devices 210-1*b*, 210-1*c* and 210-1*d* are assigned the addresses 0001, 0010 and 0011 respectively. Additionally, it is assumed that the maximum allowable address bit configuration that the memory system is to have is 48K where the term K equals 1,024 bytes of memory space. The jumpers JPφ9 through JP12 are arranged to provide an input address bit configuration of 0010 to each comparator circuit. That is, jumpers JPφ9, JP10, and JP12 are connected to ground. Since each memory module has a storage capacity of 16K, no more than three memory modules are required to be operative within the interface. The jumpers JP13 and JP14 are included to allow the use of all 16 possible code signals when the interface includes all 16 memory modules which requires the use of all 16 codes. When all 16 modules are included, jumper JP13 of block 210-8 of the first module is connected to ground and jumper JP14 of block 210-8 of the 16 module is connected. This enables the result produced by the comparator 210-1*a* of the first memory module to be overridden. Since only three modules are required, jumpers JP13 and JP14 remain unconnected.

The jumper terminals to each of the inverter circuits of block 210-8 are "floating" and therefore apply a binary ONE to the inverter circuits which forces the signals M1AD1φφ through M4AD4φφ to binary ZEROS. The adder circuit 210-2*a* and comparator circuit 210-4*a* as mentioned invert the binary bit pattern applied to their respective sets of terminals. Since the binary bit pattern of 1111 applied to terminals B3-B0 of the comparator circuit 210-4*a* does not compare identically with the binary bit pattern of 0010 applied to terminals A3-A0, carry in signal M1BLKφφ if forced to a binary ONE. The adder circuit 210-2*a* increments by one the input address bit pattern of 1111 and presents the sum φφφφ at output terminals F0-F3.

The bit pattern of φφφφ is applied to the input terminals of A0-A3 of adder circuit 210-2*b* and the input terminals B0-B3 of comparator circuit 210-4*b* of the unit positioning device 210-1*b*. Also, the pattern φφφφ (negative logic) is applied to the inverter circuits of block 210-6*a* resulting in an address bit pattern of φφφφ (positive logic) being forwarded to the Select Circuits of module 1 shown in FIG. 2*e*. Additionally, signals M10FL3φ and MAMX1φφ are forwarded to the select circuits of module 1. The state of these signals determine whether or not the module is to be selected. Under normal conditions when the module is in operation and the maximum allowable address has not been exceeded, signals M10FL3φ and MAMX1φφ are binary ZEROS.

In the module select circuits, as described herein, the address pattern provided by each unit positioner is compared with the four high order address pattern received from the CPU and the module is selected when there is a true comparison therebetween. Thus, the first unit positioner 210-1*a* by defining which address pattern is to be forwarded to the select circuits for comparison with the CPU generated pattern, establishes the address assignment for module 1.

Since there is no true comparison made by comparator circuit 214-4*b* of the second unit positioner 210-1*b* (i.e., A3-A0 = φφ1φ and B3-B0 = φφφφ), the adder circuit 210-2*b* increments by one the input bit pattern φφφφ producing a sum of φφφ1 at its output terminals F3-F0. This sum is then applied to both the comparator circuit 210-4*c* and adder circuit 210-2*c* of the third positioning device 210-1*c* of memory module 3. The pattern φφφ1 (negative logic) provided by positioner 210-1*b* is complemented by the inverter circuits of block 210-6*b* to make it compatible with the negative logic of the rest of the system and the resulting pattern φφφ1 (positive logic) is forwarded to the Select Circuits of Module 2 along with signals M20FL3φ and MAMX2φφ. Accordingly, the Select Circuits for Module 2 can only respond to the address pattern φφφ1 (positive logic).

The pattern of φφφ1 (negative logic) is then applied to input terminals A0-A3 of adder circuit 210-2*c* of the third unit positioner 210-1*c*. Since there is no true comparison made by comparator circuit 210-4*c* (i.e., A3-A0 = φφ1φ and B3-B0 = φφφ1), the adder circuit 210-2*c* also increments by one the input address pattern and applied the sum φφ1φ to output terminals F3-F0. The pattern φφ1φ is then applied to the comparator circuit 210-4*d* and adder circuit 210-2*d* of the fourth unit positioning device 210-1*d*. Also, the same pattern is complemented by the inverters of block 216-1*c* to provide positive logic representation of pattern φφ1φ and forwarded to the Select Circuits of module 3 along with signals M30FL3φ and MAMX3φφ.

The comparator circuit 210-4*d* upon detecting a true comparison between the bit patterns applied to its input terminals A0-A3 and B0-B3 (i.e., A3-A0 = φφ1φ and B3-B0 = ϕϕ1ϕ) forces signal M4BLKϕϕ to a binary ZERO. This causes the adder circuit 210-2*d* of the fourth unit positioner 210-1*d* to transfer the input bit pattern to its output terminals F0-F3 without modification. The unmodified address pattern ϕϕ1ϕ then applied to either the CPU or the positioning device of another memory module.

Additionally, the pattern 0010 provided by positioner 210-1*d* is complemented by the inverter circuits of block 210-6*d* to provide positive logic and representation of pattern ϕϕ1ϕ and forwarded to the Select Circuits of Module 4 along with the signals M40FL3ϕ and MAX4ϕϕ. Because there was a true comparison between the maximum address pattern and the pattern from unit positioner 210-1*c*, both signals M40FL3ϕ and MAX4ϕϕ are binary ONES. These signals condition the Select Circuits of Module 4 so as to prevent the CPU from addressing a storage location within the memory module.

It will be noted that with a four bit address pattern up to sixteen memory modules can be connected in series. In the present embodiment, memory modules are connected in increments of 64K (4 memory modules) wherein each increment of memory is physically located in a drawer. In the particular system illustrated, each interface has two drawers. The module positioning device of the fourth module of each interface drawer is connected in series by a corresponding one of the buses 32-1 through 32-4. The 4 bit address code pattern provided by adder circuit 210-2*d* is transmitted along the bus to the adder circuit of the unit positioning device of the first memory module of the second drawer. In the second drawer, the jumpers corresponding to JPϕ2, JPϕ4, JPϕ6 and JPϕ8 are removed and the jumpers JPϕ1, JPϕ3, JPϕ5, and JPϕ7 are inserted to receive the bit pattern from positioning device 210-1*d* of the first drawer. Also, the jumpers JPϕ9 through JP12 are arranged to establish the maximum allowable address that the memory modules can assume.

In the arrangement of the embodiment, the next four addresses ϕ1ϕϕ, ϕ1ϕ1, ϕ11ϕ and ϕ111 respectively are assigned by the unit positioners to the next four memory modules of the second drawer. The four bit address code pattern generated by the adder circuit of the unit positioner of the fourth memory module of the second drawer is transmitted to the CPU via a corresponding one of the buses 34-1 through 34-4.

MEMORY MODULE SELECT CIRCUITS SECTION 206

Figure 2E:
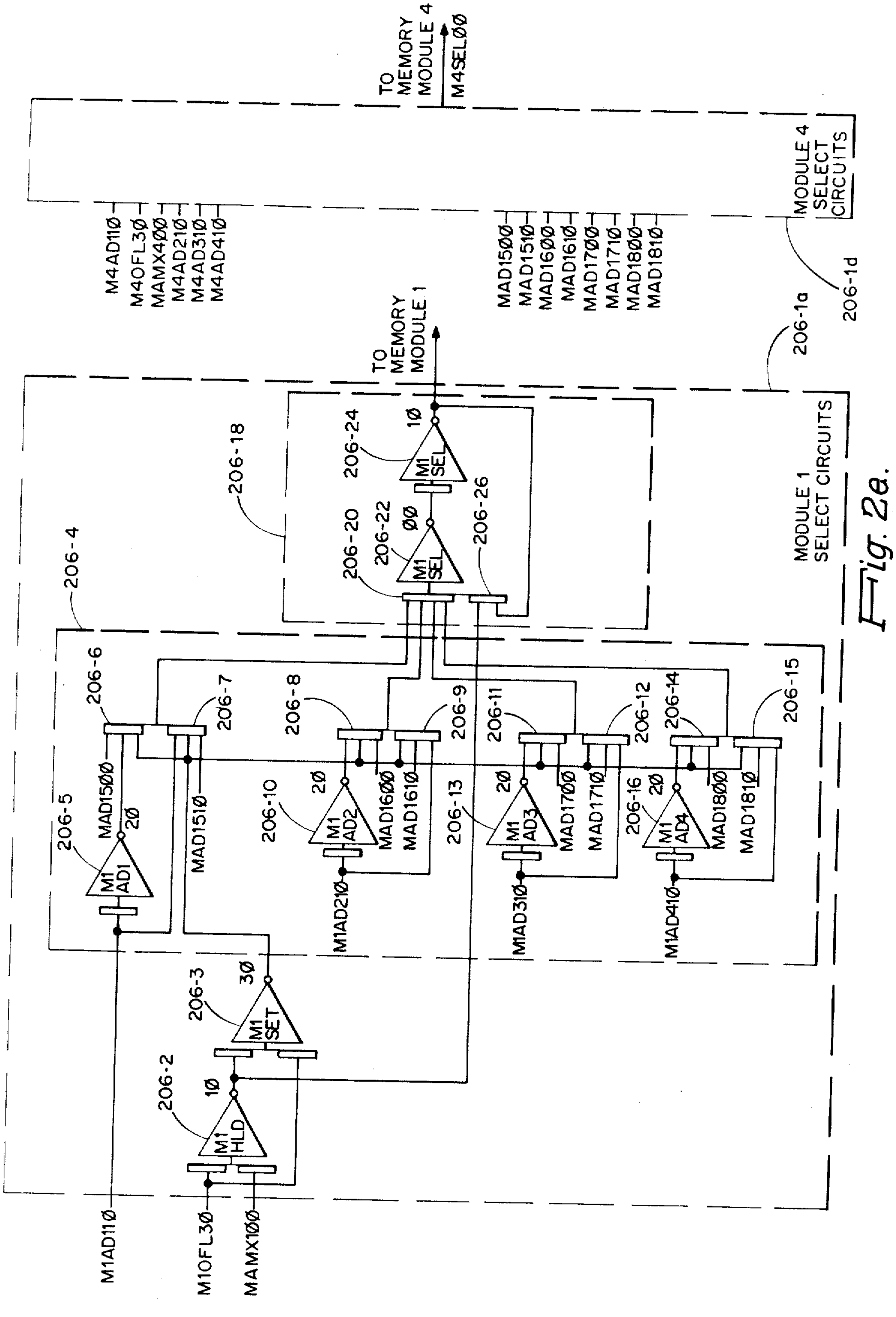
FIG. 2*e* shows in greater detail the circuit of the Module Select Section of FIG. 2.

The section 206 as shown in FIG. 2*e* includes the select circuits for each of the memory modules 1 through 4. Only the select circuits included in a block 206-1*a* for memory module 1 are shown in detail since the remaining select circuits for modules 2 through 4 have the same circuit arrangement and differ from one another only in the specific signal being processed. This is illustrated by the labeling of signals received by blocks 206-1*a* and 206-1*d*.

Referring to FIG. 2*e*, it is seen that the block 206-1*a* includes a comparison circuit section 206-4 arranged to compare the four high order address bits (signals MAD1810-MAD1510) with the 4 bit address signals (M1AD410-M1AD110) from the positioning device of the memory module included in the Module Reconfiguration Logic Circuit Section of FIGS. 2*c* and 2*d*. The comparison section includes inverter circuits 206-5, 206-10, 206-13 and 206-16 and AND gates 206-6 through 206-9, 206-11, 206-12, 206-14 and 206-15 arranged as shown.

When the Select Circuit for module 1 finds a true comparison, an AND gate 206-20 included within a latch circuit 206-18 is activated, setting the latch circuit, forcing signal M1SEL10 to a ONE. The setting of latch circuit 206-18 is further conditioned upon the enabling of an AND gate 206-26 when a hold signal M1HLD10 is in a binary ONE state. Normally, both the signals M10FL3ϕ and MAMX1ϕϕ are both ZEROS which allows the latch circuit 206-18 to be set to a binary ONE when there is a true comparison between the two sets of address signals.

When either of the signals M10FL3ϕ or the signal MAMX1ϕϕ is forced to a binary ONE by the Module Reconfiguration Section 210, the hold signal M1HLD10 is forced to a ZERO. This in turn prevents the setting of latch 206-18 to a binary ONE when there is a true comparison between the two sets of address signals. Accordingly, a memory location specified by the low order 14 bit address signals forwarded to the memory module from the CPU is not addressed unless the signal M1SEL10 is a binary ONE.

MODULE PURGE LOGIC CIRCUIT SECTION 208

Referring to FIG. 2f, it is seen that the section 208 includes a plurality of latch circuits 208-1 through 208-4, one for each of the corresponding memory modules 1 through 4. Each latch circuit is switched from a binary ZERO to a binary ONE when its associated module has not met the minimum standard of reliability as established by the checking apparatus, this being signalled by the presence of a check condition (e.g. signal M1CHK10 is a binary ONE). When a command has been initiated (i.e., signal MPURGOT is a binary ONE), this purges the memory system of each of the modules which has failed to maintain the established minimum standard of operation.

Stating the above differently, the states of each of signals M1CHK10 through M4CHK10 indicates to the positioning unit of each memory module the status of its module. The status for each module is defined by the parity error detecting circuits of FIG. 2*h*, described herein. The signal MPURGOT is generated as shown herein, either by an operator through the Maintenance Panel Logic Circuits of FIG. 3 which forces signal MPUR1ϕT to a binary ONE or by the CPU through the Continue Mode Circuits of FIG. 4*a* which forces signal MMPGO1ϕ to a binary ONE. As mentioned, the signal MPURGOT causes all memory modules with a particular check status condition to be forced to an off-line state. The signal MMINTOT is a signal which is used to initialize or reset to a binary ZERO state each of the latched storing an indicating of a check condition. The signal MMINTOT is generated by either an operator depressing an Initialize pushbutton on a control panel or by the CPU as described herein. Additionally, an operator can place manually each of the memory modules off-line through switches located on the same control panel. When an operator sets one of the switches to the off-line position, this forces a corresponding one of the signals M1FLϕϕϕ through M4FLϕϕϕ of FIG. 2f to a binary ONE state which in turn switches the corresponding one of latch circuits 208-1 through 208-4 of FIG. 2*f* to a binary ONE state. When the system is initialized, the latch circuits of FIG. 2f of the memory modules which have been placed in off-line remain in a set state. This arrangement allows an operator to maintain any module off-line until the operator has the module repaired or replaced.

PARITY CHECKING LOGIC CIRCUIT SECTION 214

Figure 2G:
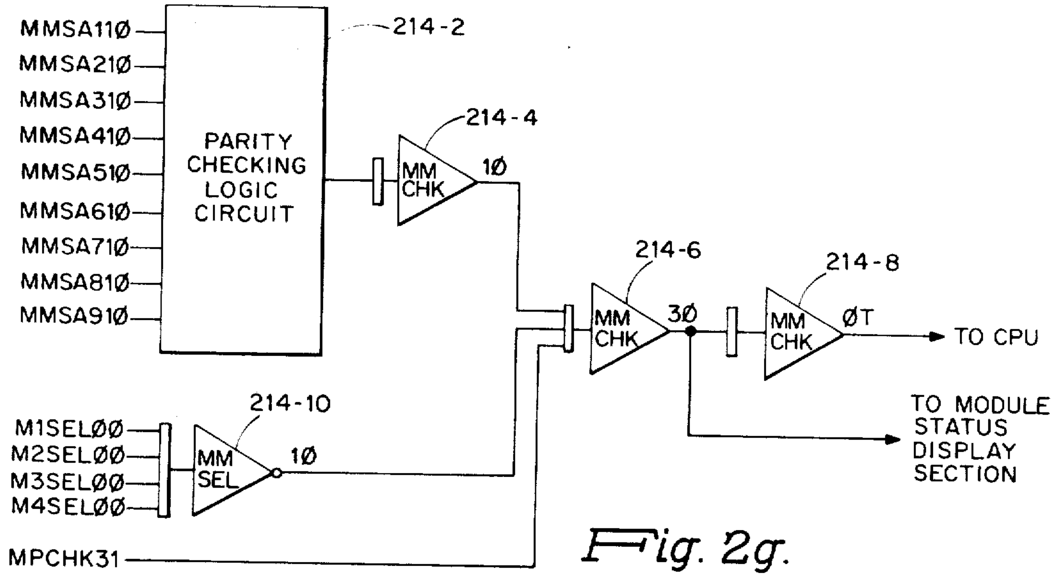
FIG. 2*g* shows in greater detail the circuits of the Parity Check Logic Circuit Section of FIG. 2.

FIG. 2*g* illustrates the checking logic circuits which establish a minimum standard of reliability for each of the memory modules 1 through 4. A parity checking logic circuit 214-2, conventional in design, performs a parity check on the conventional nine bit data output signals read from an addressed memory storage location of a selected module into the Data Latch Amplifier Circuits Section of FIG. 2*i*. That is, the circuit 214-2 generates a parity check bit signal for signals MMSA110 through MMSA810 and compares the result with signal MMSA910 by checking for odd parity.

In the event of an error, circuit 214-2 forces signal MMCHK1ϕ to a binary ONE which switches an AND gate and amplifier circuit 214-6 to a binary ONE (i.e., MMCHK3ϕ is forced to a binary ONE) when any one of the memory modules has been selected (i.e., signal MMSEL10 is a binary ONE) during the time interval of a memory cycle defined by signal MPCHK31. The results of the checking operation defined by the state of signal MMCHK3ϕ are forwarded to the circuits of the Module Status Display Section 212 of FIG. 2g. Also, an indication of the same results are forwarded via a gate and amplifier circuit 214-8 to the CPU which can prompt further processing as described herein.

Since in the arrangement described herein, only one memory module is selected for addressing at any one time, the error checking circuits of section 214 are arranged to be shared by the four memory modules. Obviously, the checking arrangement will vary as a function of the memory organization and the degree of checking desired. For example, it may be desirable in some instance to employ other error detecting methods which involve the use of other codes such as Hamming codes, for establishing a reliable operation for the memory modules of a system.

DATA LATCH AMPLIFIER CIRCUIT SECTION 216

Figure 2H:
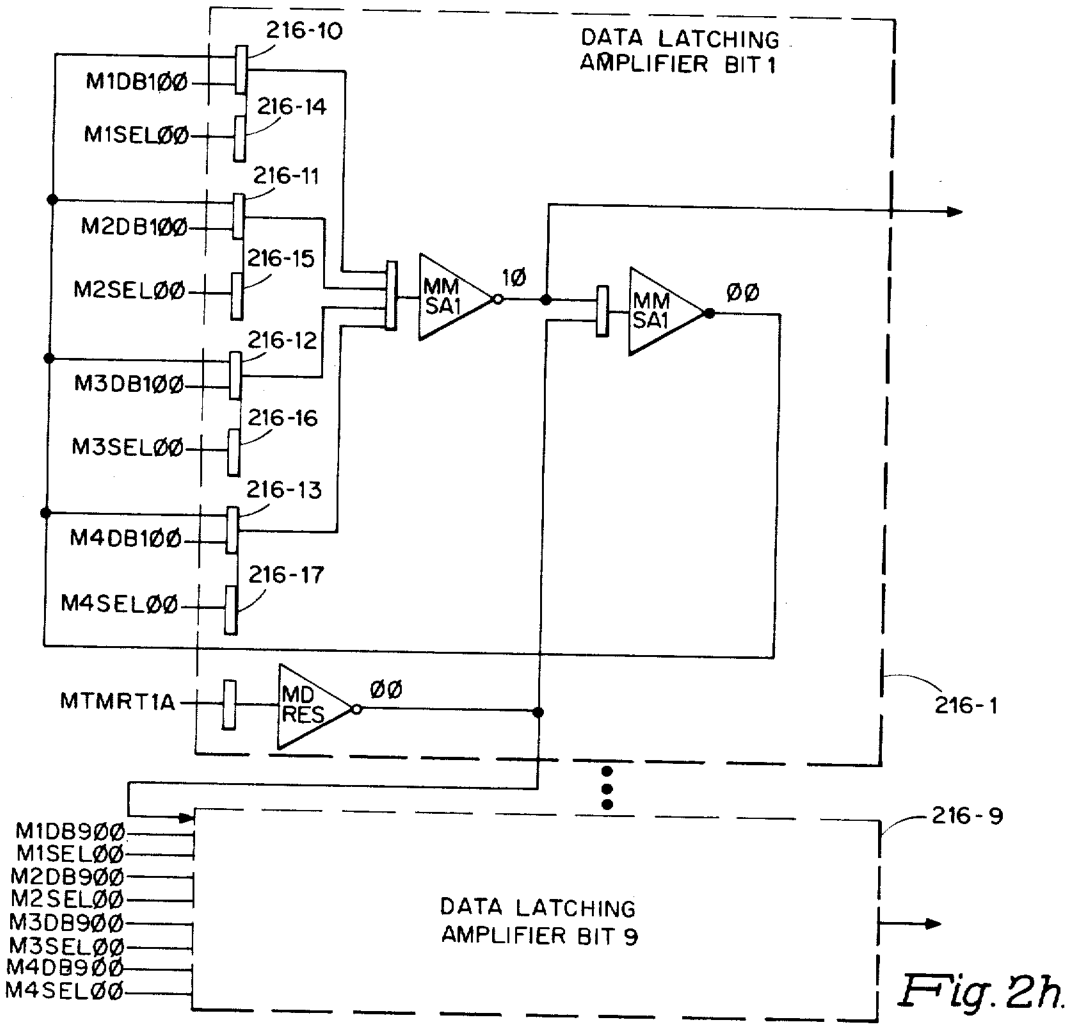
FIG. 2*h* shows in greater detail the circuits of the Data Latch Amplifier Circuit Section of FIG. 2.

Similar to the checking arrangement FIG. 2*g*, the circuits of sections 216 are arranged to be shared among the four memory modules of a drawer. As illustrated by FIG. 2*h*, the section includes nine latches 216-1 through 216-9 for storing bit representations of nine bit contents of a memory storage location of a selected module. The latch 216-1, as each of the remaining eighth latch circuits, receives a signal applied to a particular one of the data output lines from each of the memory modules (i.e., signals M1DB1ϕϕ through M4DB1ϕϕ) together with a signal from the binary ZERO output terminal of the latch circuit (i.e., signal MMSA1ϕϕ). The pairs of signals are logically combined in AND gates 216-10 through 216-13 of the latch circuit 216-1. The select signals M1SELϕϕ through M4SELϕϕ respectively are applied to gates 216-14 through 216-17.

When a module is selected its corresponding select signal is forced to a binary ZERO state while the other signals remain binary ONES. Since signal MMSA1ϕϕ is a ONE, and AND gate and inverter circuit switches to a binary ONE state when the signal applied to the corresponding data output line is forced to a ZERO (e.g. signal M1DB1ϕϕ is a ZERO). Normally, signal MDRESϕϕ of block 216-1 is a binary ONE which causes signal MMSA1ϕϕ to be switched to a ZERO. The signal MMSA1ϕϕ is recirculated back to gates 216-10 through 216-13 and maintains the latch circuit 216-1 in a binary ONE state. The latch circuit 216-1 is reset to a ZERO state when set-reset signal MTMRTIA switches to a binary ONE. Each of the other latch circuits operate in a similar fashion to store a bit representation of one of the remaining data output lines.

MODULE STATUS DISPLAY SECTION 212

Figure 2I:
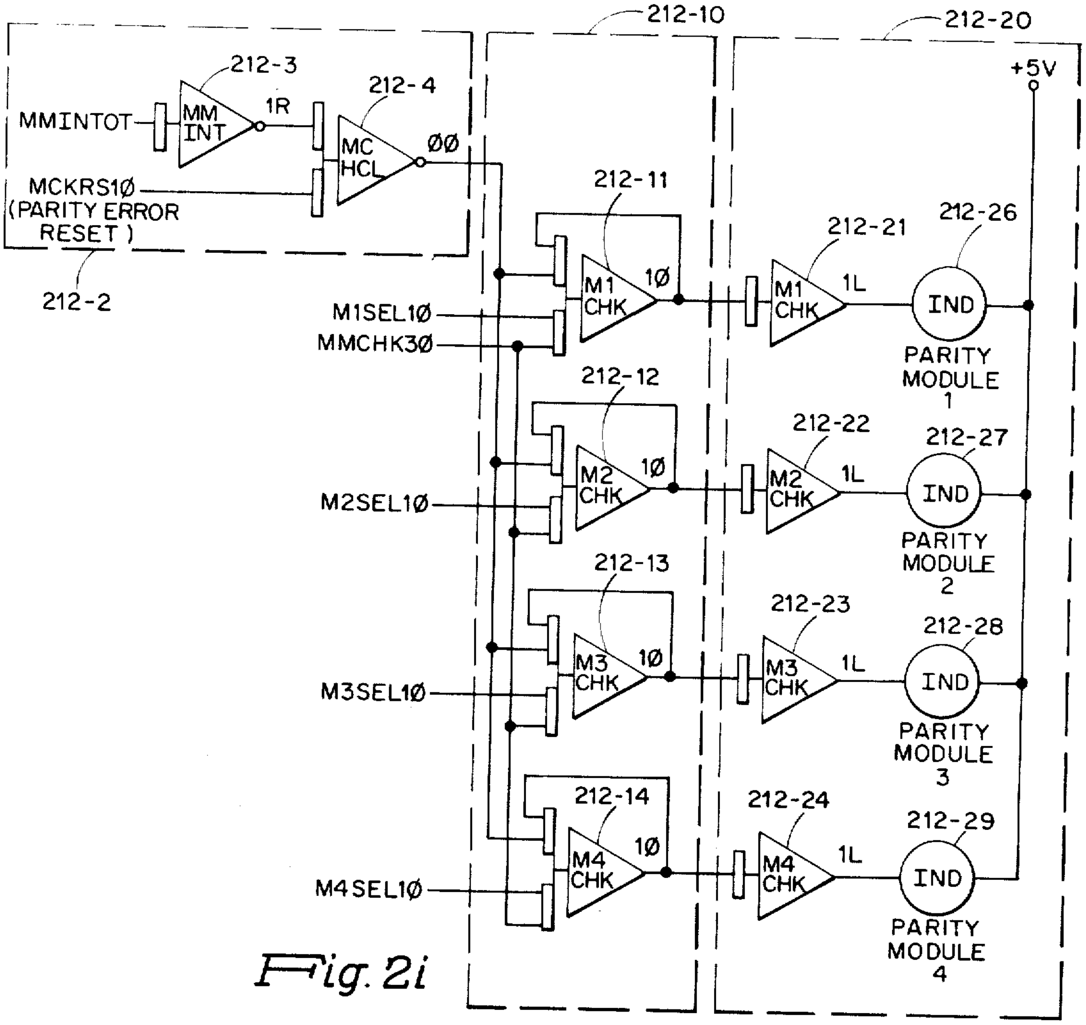
FIG. 2*i* shows in greater detail the circuits of the Module Display Status Section of FIG. 2.

The section 212 as illustrated in FIG. 2i includes reset logic circuits 212-3 through 212-4 of block 212-2, error check storage latch circuits 212-11 through 212-14 of block 212-10 and indicator and driver circuits of block 212-20. These circuits are operative to display the status of each of the modules of a drawer. For example, when a memory module is selected, a corresponding one of the module select signals M1SEL10 through M4SEL10 is forced to a binary ONE state. When a parity error occurs, signal MMCHK30 is forced to a binary ONE, switching a corresponding one of the latch circuits 212-11 through 212-14 to a binary ONE.

The driver circuit connected to the switched latch circuit forces a corresponding one of the signals M1CHK1L through M4CHK1L to ground potential illuminating one of the indicator lamps 212-26 through 212-29.

The set latch circuit is reset to a ZERO when a check clear signal MCHCLϕϕ is forced to a ZERO. This occurs when either a Parity Error Reset Switch is depressed (i.e., signal MCKRS10 is forced to a ONE) or the Initialize pushbutton is depressed (i.e., signal MMINTOT is forced to a binary ONE).

WRITE DATA LOGIC SECTION 220

Figure 2J:
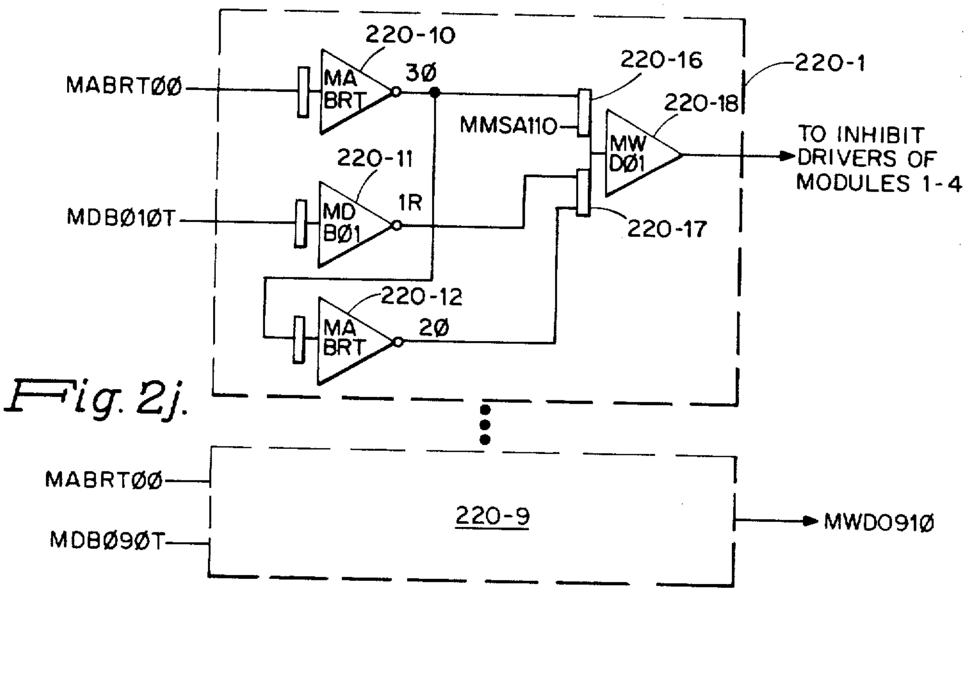
FIG. 2*j* shows in greater detail the circuits of the Write Data Logic Section of FIG. 2.

This section as seen from FIG. 2*j* includes a plurality of gate amplifier and inverter circuit stages 220-1 through 220-9 which are operative to apply output data signals MWDO11ϕ through MWD091ϕ respectively to the inhibit circuits of memory modules 1 through 4. Under the control of a Write Abort signal, MABRTϕϕ, generated by the CPU, data signals read out of an addressed memory storage location of a memory module are selectively restored or written back into the same location. For example, during a write portion of a read memory cycle (i.e., when the Write Abort signal MABRT3ϕ is a binary ONE), the same data signals read out from the memory sense circuits (e.g. signal MMSA11ϕ) are written back into the addressed location by the logic circuits. When the Write Abort signal MABRT3ϕ is a binary ZERO, then the data signals on the bus applied by the CPU are written into the addressed memory module storage location.

The stage 220-1 includes gate and inverter circuits 220-10 through 221-12, AND gates 220-16 and 220-17 and amplifier circuit 220-18 arranged as shown. The operation of the logic circuits for stage 220-1 is defined in accordance with the expression:

MWD011ϕ = MABRT3ϕ · MMSA11ϕ + MABRT20 · MDB011R.

The circuits for the remaining stages operate in a similar fashion and therefore are not shown in detail in FIG. 2*j*.

MAINTENANCE PANEL CIRCUIT

Figure 3:
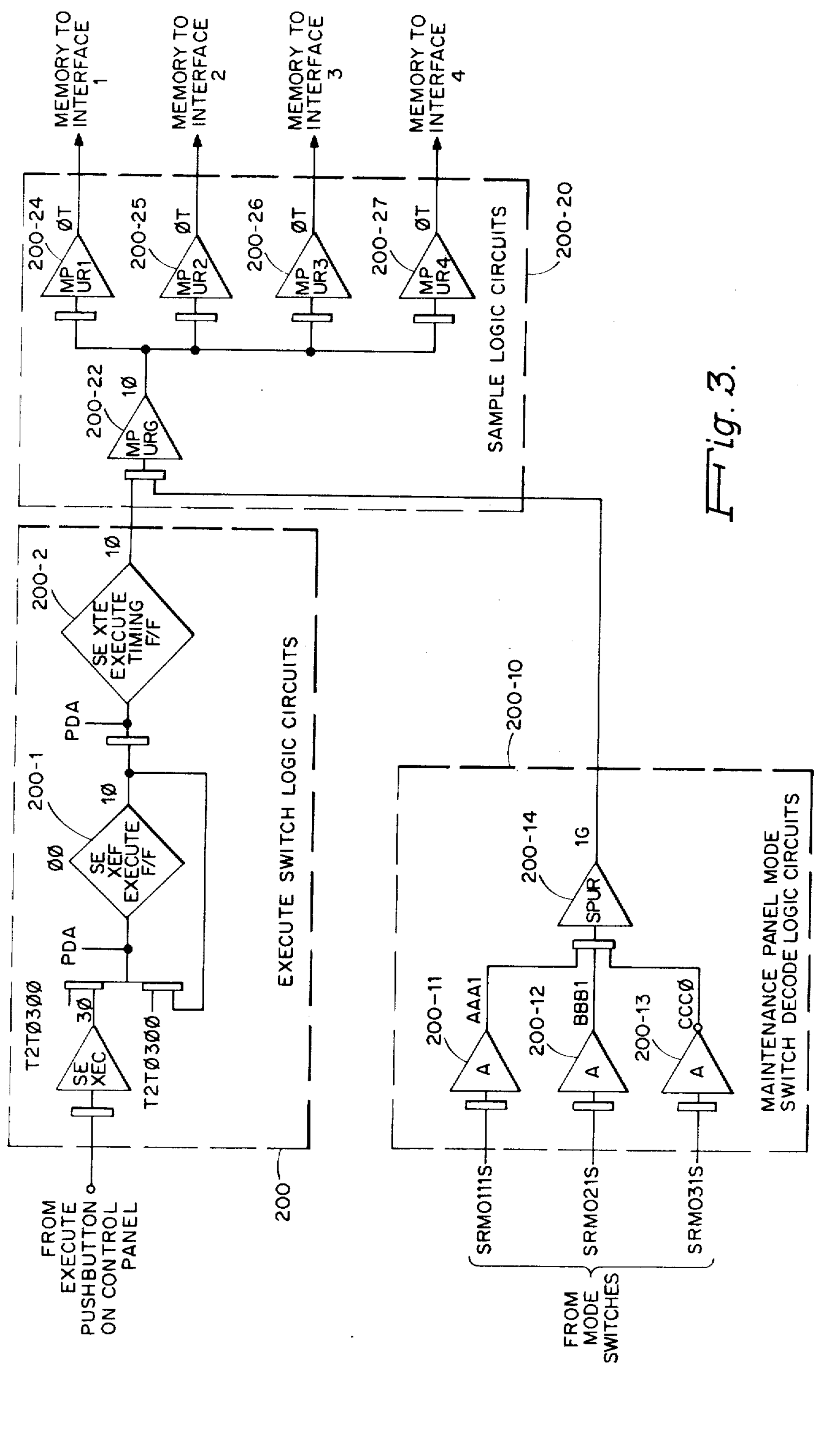
FIG. 3 shows the circuits included within a maintenance control panel.

FIG. 3 shows the pertinent logic circuits for generating signal MPUR10T which initiates sampling of the states of the status latches of each memory module for each drawer. As shown, the circuits of FIG. 3 include an Execute Switch Logic Circuits block 200, a Mode Switch Decode Logic Circuits block 200-10 and a Sample Logic Circuits block 200-20.

The selection of a position on a MODE switch located on the maintenance panel causes the generation of a three bit code which selects the operating mode desired. In particular, when a programmer or field service personnel finds it necessary to "purge" main memory, the MODE switch is placed in a purge MM position. This forces signals SRM0111S and SRM021S to binary ONES. At the same time, signal SRM031S is forced to a ZERO. The decoding of these signals by an AND gate and amplifier circuit 200-14 switches signal SPUR1G to a binary ONE so that when a operator depresses an Execute pushbutton on the maintenance panel, an AND gate and amplifier circuit 200-22 of block 200-20 switches to a binary ONE. This results in the generation of "purge" signals MPUR10T through MPUR40T which are applied to the memory interfaces 1 through 4 respectively by gate and amplifier circuits 200-24 through 200-27.

In greater detail, the depression of the Execute pushbutton forces signal SEXEC 3ϕ to a binary ONE. When a further timing signal T2T0310 switches to a binary ONE, this causes the sequential switching of a pair of clocked flip-flops 200-1 and 200-2 to binary ONES in response to a clocking signal PDA. The flip-flop 200-1 is held in its ONE state by input signal T2T03ϕϕ. This signal is generated by a free running main timing unit of the CPU. The flip-flops 200-2 are reset to ZEROS in sequence upon the occurrence of a subsequent PDA signal when the EXECUTE button is released (signal SEXEC 3ϕ switches to a ZERO) and signal T2T031ϕ is again switched to a binary ONE.

CPU LOGIC CIRCUITS

Figure 4B:
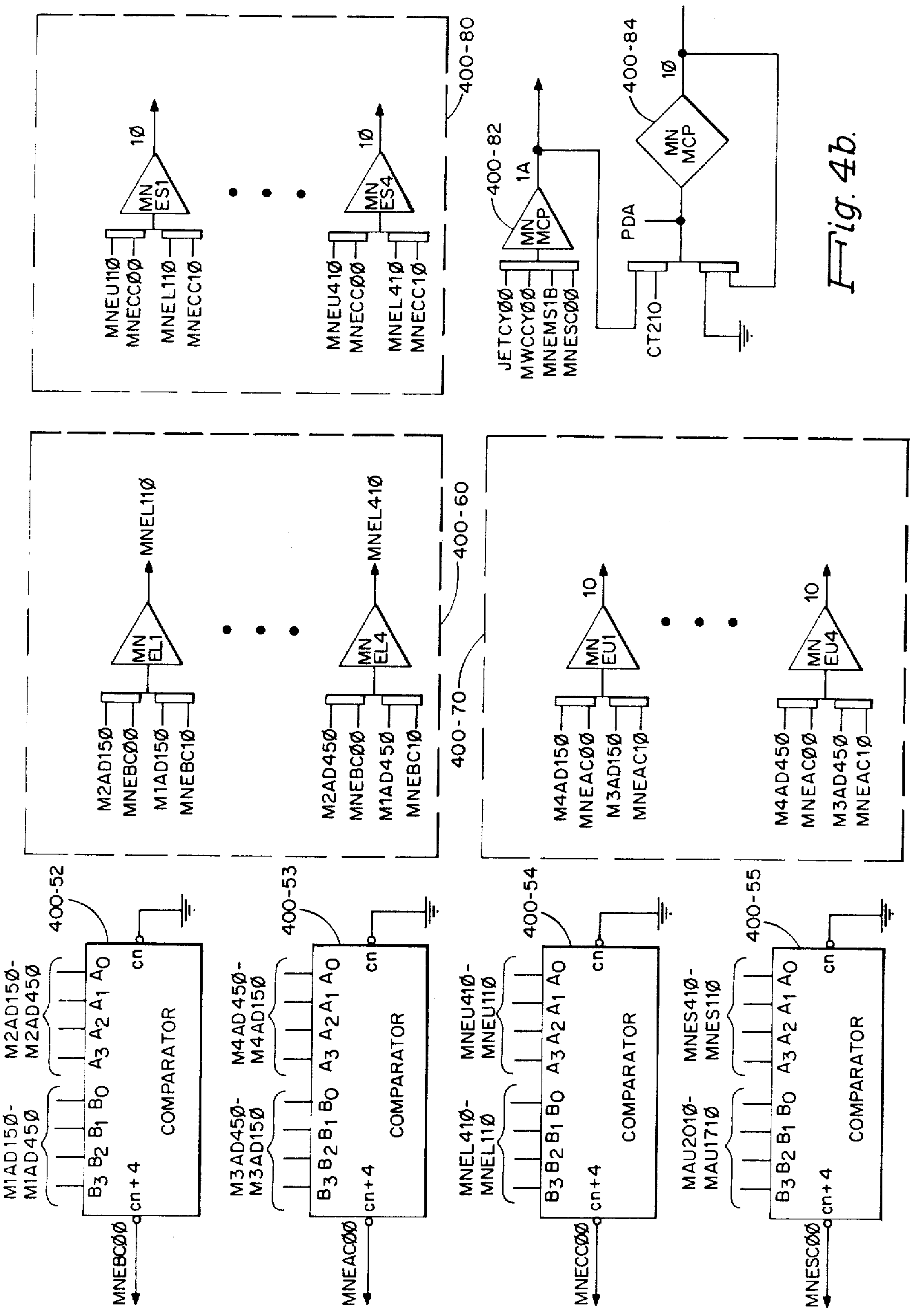
FIG. 4*b* shows the circuits within the CPU of FIG. 1 for detecting a non-existent error check condition in accordance with the present invention.
Figure 4A:
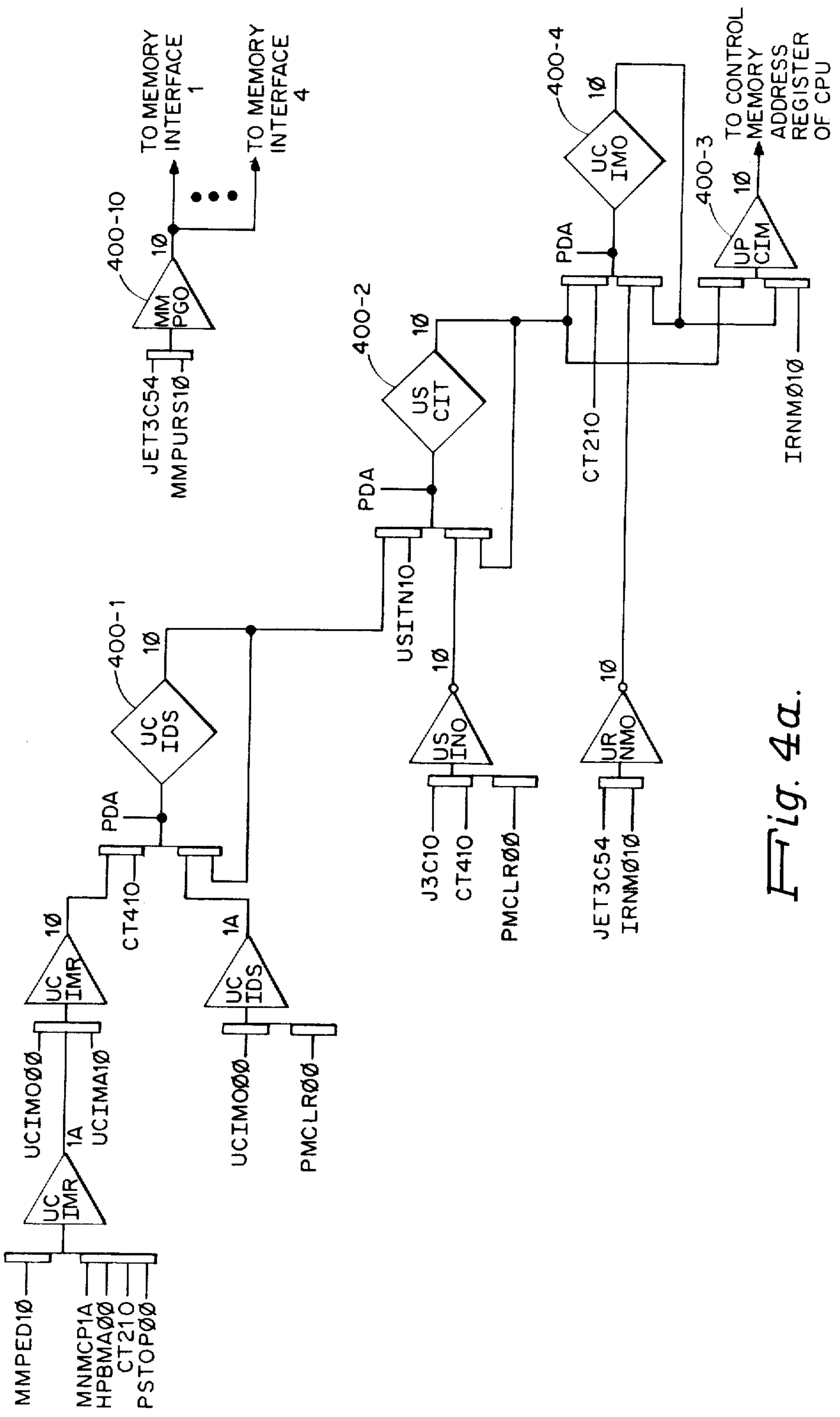
FIG. 4*a* shows a portion of the CPU of FIG. 1 for processing certain error check conditions.

Before describing the operation of the invention, reference will be first made to FIGS. 4*a* and 4*b* which illustrate certain portions of the CPU which may be used to control the apparatus of the invention.

FIG. 4*a* illustrates the control logic circuits included in the CPU for processing a memory parity error when the CPU is being operated in a "continue interrupt mode". This mode enables the CPU to interrogate the occurrence of error conditions such as those caused by hardware failures and those attributed to software which can halt CPU operation and then to make a decision as to whether a halt is necessary.

As shown, the logic circuits include a Continue Demand Stored clocked flip-flop 400-1 which switches to a binary ONE in response to occurrence of error conditions specified by signals MMPED10 and MNEMS10.

The signal MMPED10 is derived by combining the check signals from each of the memory interfaces via an OR circuit (e.g. signal MMCHKϕT generated by the parity check circuits (FIG. 2*h*) of each memory interface) so as to indicate the occurrence of a parity error within any one of the memory modules within the system. The signal MNEMS10 indicates that the storage location addressed is not within the established memory size as described herein. The signal MNEMS10 switches flip-flop 400-1 to a binary ONE when an attempt to address non-existent area of memory is made during other than normal processing as for example when the CPU is operating in an interrupt mode (i.e., signal HBMA01ϕ is a ZERO), when the CPU has not already been placed in this mode (i.e., UCIMϕϕ is a binary ONE) and a continue mode allowed indicator has been set via an instruction (i.e., signal UCIMA10 is a binary ONE).

When flip-flop 400-1 switches to a binary ONE, it causes a further flip-flop 400-2 to switch a Continue Interrupt Mode Operation flip-flop 400-4 to a binary ONE when a CPU generated timing signal TBCT210 switches to a binary ONE. The flip-flop 400-2 sets after the CPU executes an instruction while in the interrupt mode. This allows the storage of status information prior to entering the continue mode of processing. When flip-flop 400-2 switches, it forces a predetermined address bit configuration into a control memory address register of the CPU via a gate and amplifier circuit 400-3. This in turn causes the addressing of a predetermined storage location within control memory of the CPU whose contents are exchanged with the sequence program counter contents to reference the beginning of a first instruction of subroutine for processing the error.

The processing involves determining the type of error and then deciding what action to take. When the error is the result of a memory check condition, the CPU makes a decision as whether it is necessary to "purge" memory. When the CPU determines that "purging" is required, it executes an instruction which results in forcing signal MPURGOT to a binary ONE. As shown in FIG. 4a, this is accomplished during an interrupt processing cycle by forcing a signal MMPURS10 to a binary ONE.

The CPU is then returned to its normal mode of operation via a further instruction (e.g. Resume Normal Mode instruction) which forces signal IRNM010 to a ZERO during an interrupt processing cycle (i.e., when signal JET3C54 is a binary ONE). This resets flip-flop 400-2 to a ZERO and causes the same interrupt storage location to be addressed and the exchange of the sequence counter contents which returns the CPU to its previous mode of operation. For further information regarding certain ones of the types of instructions mentioned and their use within the CPU, the publication titled "Series 200 Programmers' Reference Manual Models 200 through 4200", dated Feb. 26, 1971 (order number 139) may be consulted.

It will also be noted from FIG. 4*a* that the Continue Demand Stored flip-flop 400-1 will be also switched to a binary ONE when a non-existent memory check condition occurs (i.e., when signal MNMCPIA is a binary ONE) provided that the CPU is operating in an interrupt mode of operation (i.e., signals HBMA010 and PSTOPϕϕ are both ONES). The non-existent memory check apparatus described herein compares an assigned memory address of each instruction presented to main memory with a value of the maximum memory available to the system. When the assigned address equals or exceeds this value, the apparatus signals the presence of a non-existent memory error by forcing signal MNMCPIA to a binary ONE.

NON-EXISTENT MEMORY CHECKING SECTION

FIG. 4b illustrates the logic circuits which determine the occurrence of a non-existent memory check error and the circuits which store an indication thereof. The section includes a number comparator logic circuits 400-52 through 400-55, which are constructed from the same chip described previously. Each comparator circuit compares different sets of the four bit address signals for determining whether the high order four bit address signals from the CPU equals or is greater than any one of the sets of signals.

Referring to the Figure, it is seen that the comparator circuits 400-52 and 500-53 respectively compare the sets of address bits from the first two memory interfaces and from last two interfaces. Comparator circuit 400-54 compares the two sets of address signals transferred thereto by the gate circuits included within the block 400-60 and 400-70. These circuits are conditioned by a carry out output signal and its complement (i.e., signals MNEBCϕϕ and MNEBC1ϕ) from the comparator circuit associated therewith to transfer the lower of the two sets of address signals to a next comparator circuit. Additionally, an input carry in signal is inserted into each comparator circuits (i.e., CN is forced to a binary ONE) so as to transfer one set of signals to the next comparator circuit when the both sets of signals being compared are equal in value. Each of the comparison circuits performs the comparison arithmetically, by performing a subtraction operation represented by the equation A - B - 1 where A and B correspond to the signals applied to input terminals A0-A3 and B0-B3 respectively.

The comparator circuit 400-54 then conditions the gate circuits of a block 400-80 to transfer the lower of the two sets of signals representative of the lowest of the four sets of address signals to comparator circuit 400-55 for comparison with the high order address signals from the memory address register.

When an attempt is made to transfer information to a storage location in a memory module whose number equals or is less than that designated by the high order bit contents of the memory address register, the apparatus inhibits such transfer and signals an address violation by forcing the MNMCPIA signal to a binary ONE via an AND gate 400-82. That is, when the CPU allows the check to occur (i.e., when signal MNEMS1B is a binary ONE), the signal MNESCϕϕ when forced to a binary ONE by comparator circuit 400-55 switches signal MNMCPIA to a binary ONE during the read portion of a memory cycle (i.e., signal MWCCYϕϕ is a ONE). During a processing cycle (i.e., when signal CT210 is a ONE), a Non-Existent Memory Check flip-flop 400-84 for the CPU is switched to a binary ONE. The flip-flop 400-84 resets to a binary ZERO upon the occurrence of a subsequent PDA timing signal.

DETAILED DESCRIPTION OF SYSTEM OPERATION

Figure 5D:
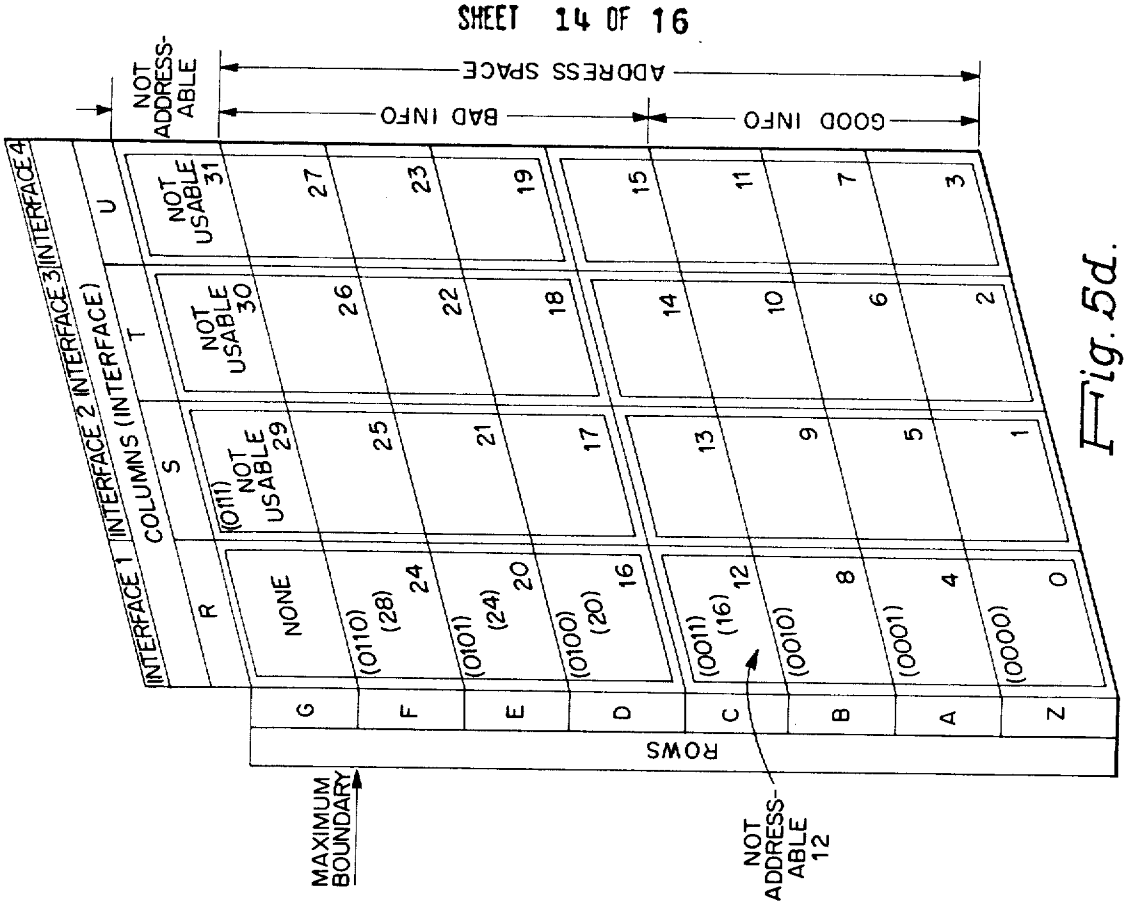

With reference to the above figures, the operation of the memory system embodying the present invention will now be described with particular reference to the drawings in FIGS. 5a through 5h. FIG. 5a illustrates, diagrammatically, the allocation of memory modules to physical units or drawers within the memory system of FIG. 1.

The 32 memory modules of the memory interfaces are numbered for addressing purposes so as to permit the access of four character modules simultaneously for reading out four consecutive characters in parallel. That is, the character addresses are interleaved among the modules of the four interfaces as shown which permits the access of any four characters within a single memory access cycle. In particular, as illustrated by FIG. 1, the character addresses are interleaved among the four memory interfaces in a cyclic manner. Specifically, the first interface responds to character addresses $0 + 4^M$, where M corresponds to word addresses 0 through $2^{19} - 1$. Similarly, the second, third and fourth interfaces are assigned the character address $1 + 4^M$, $2 + 4^M$, and $3 + 4^M$, respectively.

The memory modules of each interface are assigned the addresses 0000 through 0111 by their respective positioning units as also indicated in FIG. 5a. The last module within each memory interface provides the CPU with signals indicative of the quantity or number of memory modules available for use. Normally, when all modules are available for use, this number corresponds to the signal representation 0111.

FIG. 5b illustrates diagramatically, the address space available during normal operation. As previously mentioned, each module constitutes a 16K character memory increment (16,384 characters) which provides a maximum addressable memory space of 131,072 characters for each interface and a total memory space of 524,288 characters or bytes. In FIG. 5b, it is seen that each row designator specifies 16,384 rows of four-character words.

Initially, for the purpose of ease of explanation, it is assumed that the memory system of FIG. 1 does not include any spare memory modules. This means that the jumper card corresponding to card 212 in FIG. 2c, included within each of the drawers 1, 3, 5, and 7, is wired to specify a maximum available module number bit configuration of 0111 to each of the module positioning units within the memory system.

It will be appreciated that the interface which returns the smallest bit configuration of modules available determines the maximum boundary for the memory system of FIG. 1. As shown in FIG. 5b, the maximum boundary corresponds to a memory storage location having a character address greater than the last storage location of the eighth memory module of each interface (i.e., modules 28–31 in FIG. 5b). When the initial word storage location address (i.e., the address specifying the first character storage location within the four consecutive character storage locations being addressed) presented to the memory system exceeds the maximum boundary, the CPU causes an exception condition referred to previously as a nonexistent memory check. As mentioned, this condition can cause an internal interrupt or stop the CPU from further processing depending upon the mode of operation in which the CPU is operating at the time.

Figure 5C:
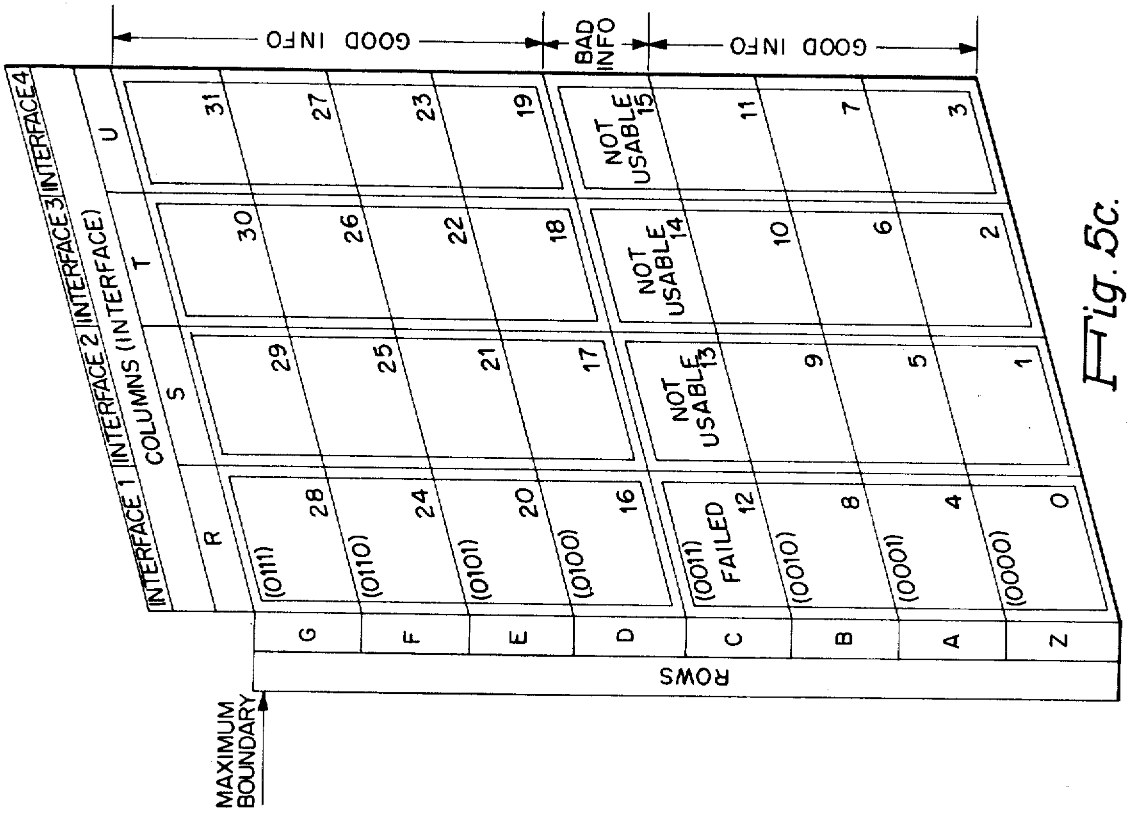

FIG. 5c illustrates diagramatically the memory address space when a module has failed. It is assumed here that module 12 (i.e., the fourth module in the second drawer) has failed. More specifically, it is assumed that the parity check logic circuit section 214 of FIG. 2h has detected a parity error in the data read out from the sense amplifiers of the fourth memory module of FIG. 2 into the Data Latch Circuit Section 216. The error condition relating to the operation of the particular module is stored as a check condition by the Module Display Data Section 212. More particularly, referring to FIG. 2*i*, it will be noted that the occurrence of a parity error check condition causes signal MMCHK3ϕ to be forced to a binary ONE which in turn forces the latch circuit 212-14 to a binary ONE state. This in turn causes the indicator lamp 212-29 of section 212-20 to be illuminated.

It can be seen from FIG. 5*c* that when a module fails, the information stored in that module and the other three modules included in the same row as the faculty module can be considered no longer to be valid. The reason is that the information contents of the modules located within the same row of a failed module is no longer valid since accessing information stored within any one of the modules within the row includes the faulty module 12. However, the information located above or below row c which includes the faulty module 12 is still valid and available for access.

FIG. 5*d* shows diagramatically the address space of the memory system of FIG. 1 after the memory modules of the system have been automatically reconfigured and before the memory system has been reloaded with information. As mentioned, reconfiguration can be initiated either by an operator or by the CPU. In one instance, the operator initiates memory reconfirmation either by placing the faulty module in an off-line state using a control switch on the drawer containing the faulty module or by setting the MODE switch located on the maintenance panel to the purge MM position and then depressing the EXECUTE pushbutton on the same panel.

From FIG. 2*f*, it is seen that switching module 12 off-line causes signal M4FL0ϕϕ to be switched to a binary ONE. This in turn switches latch circuit 208-4 to a binary ONE state causing signal M40FL1ϕ to be switched to a binary ONE state. With signal M40FL1ϕ in a binary ONE state, it is seen from FIG. 2*d* that this causes gate and inverter circuit **210-6*d* to force signal M4BLKϕϕ** to a binary ZERO state.

This inhibits the generation of a carry in signal C*n* to adder circuit **210-2*d* which causes the circuit to produce a sum at its output terminal F0 through F3. The sum corresponds to the unmodified bit pattern 0010 applied to the adder circuit input terminals A0 through A3. The other unit positioners of FIGS. 2***c* and 2*d* are operative to modify the bit pattern applied to their input terminals A0 through A3 which result in the memory modules 0, 4, 8, 16, 20, 24, and 28 of FIG. 5*c* being assigned module addresses 0000 through 0110 respectively. Thus, it is seen that the faulty module causes the next module within its column (i.e., R) to be assigned its address and reduces by one the total number of modules.

Even though the unit positioner of the faulty memory module 12 transfers the address bit pattern 0010 to its module select circuits which are identical to the address pattern transferred by the CPU, these circuits are prevented by signal M40FL3ϕ from responding to these address signals. That is, when signal M40FL3ϕ is a binary ONE, the module select circuits of the fourth module (i.e., module 4 of FIG. **2*d*) of interface 1 is inhibited from generating the select signal M4SEL10 when the select circuit detects a true comparison between the assigned address signals and the address signals presented by the CPU. Therefore, the unit positioner automatically removes module 12 of interface 1** from the memory system, and replaces it with the next module on the column which shifts the positions of the remaining modules having higher addresses by one row position with respect to the rest of the system as indicated in FIG. 5*d* by the numbers 16, 20, 24 and 28 in parentheses.

Because there are no faulty modules in the remaining interfaces, the unit positioners of the interfaces maintain the same module address assignments for their respective modules as indicated by the numbers assigned to the modules of columns S, T and U shown in FIG. 5*d*. Because the total number of modules transferred to the CPU by interface 1 is less than those of the other interfaces, the maximum boundary of memory space in the memory system is decreased by $2^{16}$ (65,536) characters as shown by space labeled nonaddressable in FIG. 5*d*.

When an attempt is made to access a four character word located above the maximum memory boundary (i.e., modules in row G), the module select circuits of the Module in Column R (see FIG. 2e) inhibit the generation of a module select signal (e.g. M4SEL1ϕ). The module select circuits of the other columns will still generate the select signal. However, the CPU logic circuits of FIG. 4*b* signal a nonexistent memory check by forcing signal MMMCPIA to a binary ONE. More particularly, it is seen from FIG. 4*b* that the number signals from interfaces 1 and 2 are compared by comparator 400-52. The number having the smallest value is transferred to comparator circuit 400-54 via gate circuits of block 400-60 for comparison with the results of a comparison operation performed by comparator 400-53 between the number signals of interfaces 3 and 4. The circuits of block 400-70 transfer the smaller of the two number signals compared by the comparator circuit 400-54 for comparison with the high order bits of the memory address being processed by the CPU.

When the initial address being processed is greater than the smallest of the module number signals returned from the memory interfaces, this causes comparator circuit 400-55 to force carry out signal MNESCϕϕ to a binary ONE which in turn signals the non-existent memory check condition to the CPU. As mentioned previously, the logic circuits of FIG. 4*a* are operative to cause an interrupt in the CPU processing which permits the CPU to determine which action to take in processing the check condition mentioned. Normally, the CPU is operative to prevent the access to the faulty memory module from occurring and to flag the non-existent error condition.

The above reconfiguration operation may be initiated as mentioned automatically by the CPU. That is, the CPU can be operative to force signal MPURG1ϕT to a binary ONE state when it receives a parity error indication from one of the memory interfaces. For example, when the parity check logic circuit section 214 detects a parity error in the fourth module, it is then operative to force signal MMCHK0T to a binary ONE state which in turn forces memory parity error signal MMPED10 to a binary ONE. As mentioned, the memory parity signal is derived by combining via an OR circuit (not shown) the check signals from each of the memory interfaces (e.g. signal MMCHK0T from each memory interface).

When the CPU is operating in the continue interrupt mode, it is operative upon sensing the check condition to generate an interrupt demand signal which causes the CPU to reference a first instruction within a recovery management program routine. As part of the program routine, the CPU determines the type of corrective procedure required for handling the error condition.

As is well known in the art, various strategies may be employed to reduce the impact of this type of failure. For example, the CPU might retry the offending instruction when feasible and after repeated retries call for reconfiguration of the memory by switching signal MMPURS10 to a binary ONE. This automatically "purges" all of the faulty modules from the memory system and causes reconfiguration of the remaining memory modules to form a new continuous address space. This results in the address space arranged as shown in FIG. 5*d*.

While the information stored in modules 13 through 27 is labeled as invalid in FIG. 5*d*, it is not invalid if the information is accessed on a character-by-character basis. However, because module 12 has been removed automatically from the address space, the address space reduced and redistributed among modules 16, 20, 24 and 28, the assignment of character addresses has been altered by the reconfiguration. It is this fact which essentially makes the information in the remaining modules invalid. Therefore, as part of the recovery management program routine, it is necessary to reload the contents of the memory modules.

It will be appreciated that after reconfiguration has corrected the failure by removing the faulty module and reconfiguring the remaining modules so as to provide a continuous address space, the CPU decides where to restart the program being run prior to failure. It may not always be feasible to run an entire set of programs again from the start, either due to time limitations or because the required data in memory has been modified by the programs executed previously. It has been found desirable in such instances to have a number of rollback points (e.g. checkpoints) within the program being executed which automatically provides for the saving of certain program and CPU status information.

When a fualt is detected and reconfiguration has been initiated, the CPU rolls back the program to a previous checkpoint where the system status is known and considered to be valid. Of course, such rollback points will be eliminated from consideration at the point of failure and above. Also, the procedure may require the removal of certain jobs from execution and delay of their execution until later as a result of the reduction in memory space.

Various techniques can be utilized for implementing recovery. Some of these techniques are discussed in an article entitled "Rollback and Recovery Strategies for Computer Programs", authored by K. M. Chandy and C. B. Ramamoorthy, IEEE Transactions on Computers, Volume C-21, No. 6, June 1972.

Figures 5E, 5F:
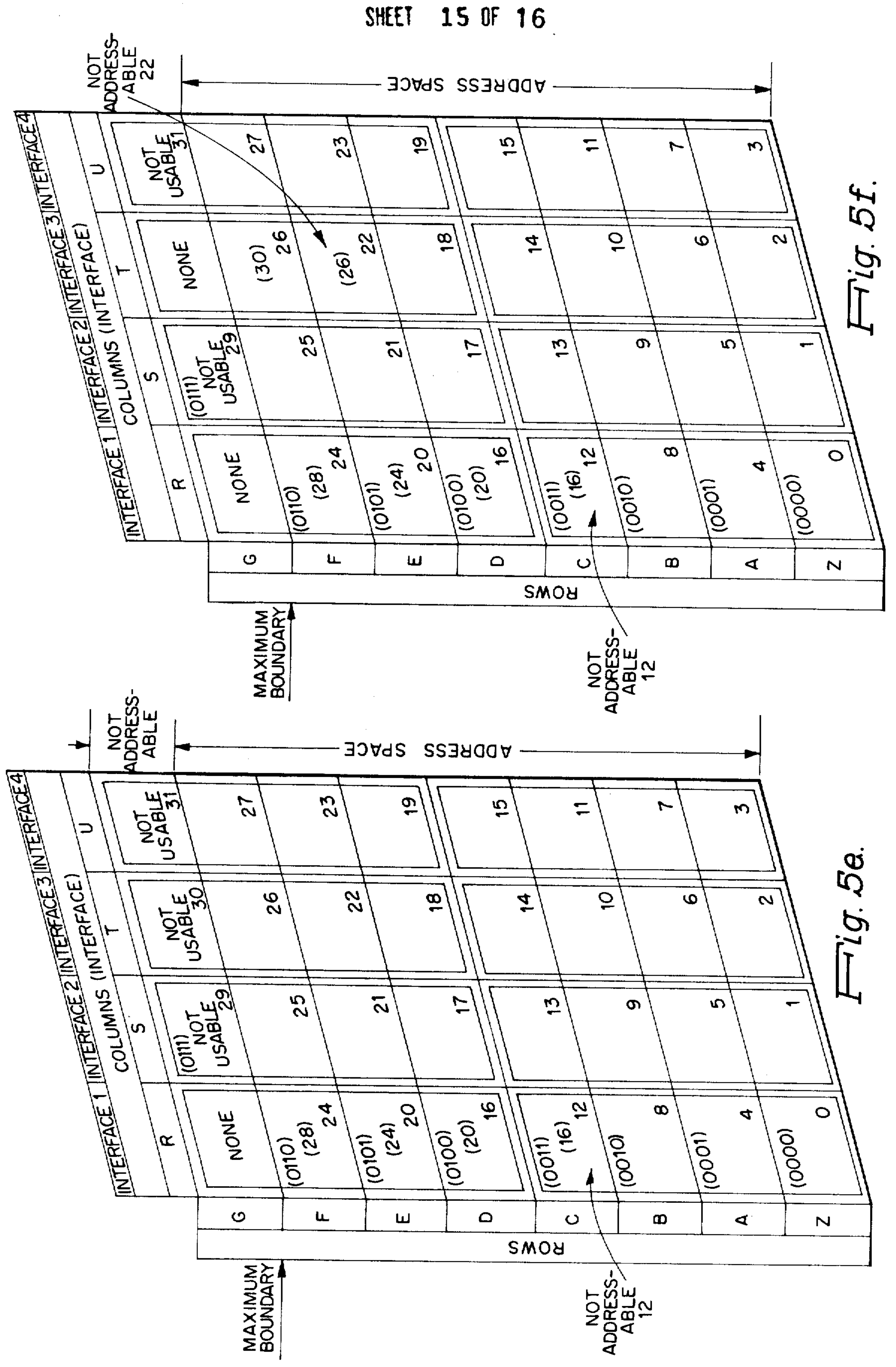

FIG. 5*e* illustrates in diagramatic form the address space after reconfiguration and after the memory system has been reloaded with information. FIG. 5*f* illustrates diagramatically the address space after the occurrence of a second module failure (i.e., module 22) following reconfiguration and reloading of the memory system.

It can be seen from FIG. 5*f* that the reconfiguration arrangement of the present invention does not reduce the amount of interleaving in the system until all of the modules of a given interface (column) have been determined to be faulty. In order to provide for protection against this occurrence and at the same time provide a means of allowing for at least one module failure without reducing the amount of memory space, the module reconfiguration logic circuit section 210 of each memory interface can be arranged to provide for a spare module. This is accomplished by arranging the jumper card included within each Module Reconfiguration Section to specify a maximum number of modules which is one less than the number of modules available for the address space. For example, the jumper card 210-8 of FIG. 2*c* within each memory interface is wired to present a maximum number code of 0110 and the normal address space is as illustrated in FIG. 5*g*. It will be noted that the maximum boundary corresponds to the last storage location of row F.

For the ease of explanation, it is again assumed that the fourth module of FIG. 2, module 12, has failed and that the CPU has determined that reconfiguration of the memory system is required. Accordingly, the CPU is operative to force control signal MMPURS10 to a binary ONE which "purges" the memory system of all failed modules.

Figure 5H:
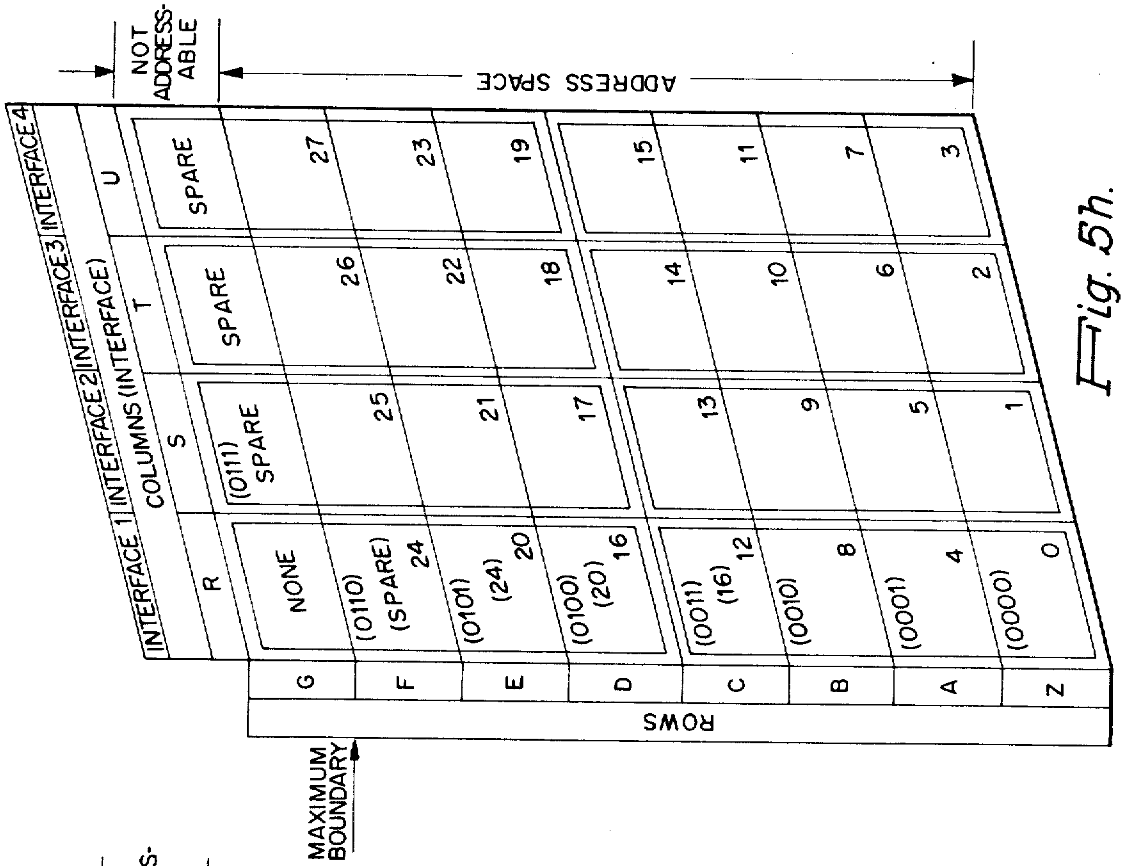
Figure 5G:
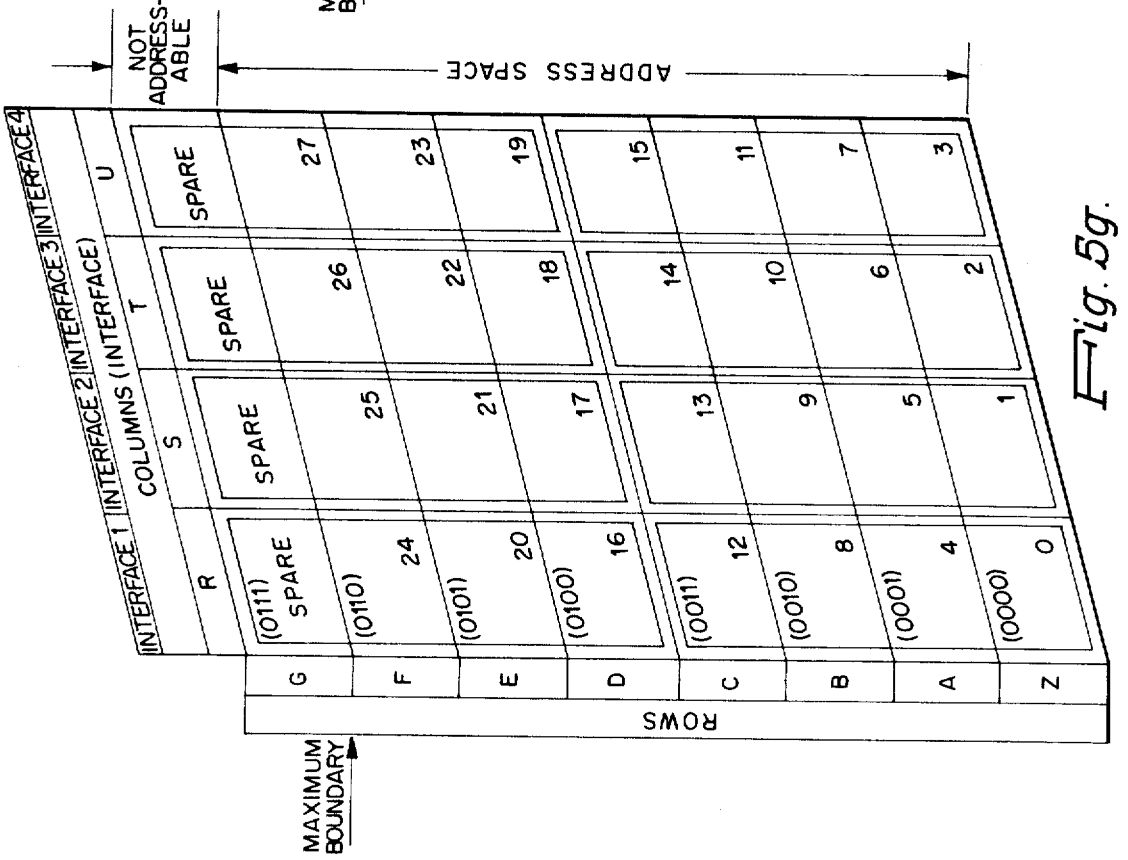

Referring to FIG. 5*h*, it is seen that the faulty module 12 is removed, replaced by the next module in column R and the remaining modules are shifted in their position in the manner previously described. However, it will be noted the spare memory module is added to column R (i.e., assigned the address 0110 by its unit positioner) and the maximum memory boundary remains unchanged. That is, prior to reconfiguration, the unit positioner of the spare memory module is effectively disconnected by the system by being inhibited by its associated comparator circuit from incrementing by one the input number signals applied to its adder circuit. Further, it is inhibited from generating a module select signal for selecting its memory module. Inhibiting occurs because the comparator circuit forces signal MAMX4ϕϕ to a binary ONE which prevents a carry-in from being applied to the adder circuit. Also, the same signal inhibits its module select circuits from generating a module select signal enabling access to a storage location within the spare module.

Considering the above in greater detail, it is assumed that the fourth module of FIG. 2*d* corresponds to the spare module. it is seen that prior to reconfiguration, the module number signals applied to the input terminals A0-A3 of comparator 210-4*a* are compared with the signals applied to input terminals B0-B3. Since the signals applied to the comparator circuit via B0 through B3 terminals correspond to the bit pattern ϕ11ϕ and the signals applied to the comparator circuit via input terminals A0 through A3 correspond to the bit pattern ϕ11ϕ, comparator circuit 210-4d is operative in response to the true comparison to force signal MAMX4ϕϕ to a binary ONE while at the same time it forces signal M4BLKϕϕ to a binary ZERO. The signal M4BLKϕϕ therefore provides a ZERO carry-in to its adder circuit which prevents it from incrementing by one the signals applied to input terminals A0-A3. It is seen from FIG. 2*e* that the signals MAMX4ϕϕ and M4BLKϕϕ cause a hold signal corresponding to M4HLD1ϕ to be forced to a binary ZERO which prevents the memory latch select circuit for the fourth module from being switched to a binary ONE state (i.e., prevents signal M4SEL1$\phi$ from being switched to a binary ONE).

However, following reconfiguration, the module number signals applied to the comparator circuit **210-4*d* via input terminals B0-B3 of the same spare memory module are reduced by one and now correspond to the bit pattern 0101. Therefore, the comparator circuit 210-4*d* does not sense a true comparison and is unable to force signal MAMX4$\phi\phi$ to a binary ONE and signal M4BLK$\phi\phi$ to a binary ZERO. Hence, the unit positioner 210-1*d* of the spare module is operative to increment by one the address signals applied to input terminals A0-A3 of its adder circuit 210-2*d*** and permit selection of its memory module via its memory select latch circuit.

As previously mentioned, the modified signals from the spare module corresponding to the bit pattern 0110 are transferred to the CPU where the logic circuits of **FIG. 4*d* sense whether the maximum allowable address space boundary has been exceeded. The address assignments to the memory modules of the remaining interfaces remain the same as shown by FIG. 5*h***. It will be appreciated that a subsequent module failure within any one or remaining columns will result in the inclusion of the spare module within that column.

It is seen from the foregoing explanation that the invention by including a spare memory module within each memory interface is able to maintain the same memory space in the event of the occurrence of a single memory module failure within each interface. Of course, it will be appreciated that a number of spare modules can be increased to suit the system needs as required.

It will be also appreciated that the arrangement described simply and efficiently provides a means of guaranteeing a specified amount of memory space for a system. Additionally, it provides an added advantage of insuring that the interleaving capability of the memory system is not impaired by a predetermined number of memory failures.

It will be noted and readily apparent to those skilled in the art that many modifications can be made to the apparatus of the present invention without departing from its teachings. For example, while the invention has illustrated a specific form of unit positioning device, it will be obvious that other types of unit positioner devices may be used to assign numerical bit patterns to each of the memory modules. Also, it will be equally obvious to those skilled in the art that other means may be provided for adding spare modules to the memory system. Lastly, it will also appear obvious to those skilled in the art that a variety of memory error detection techniques and memory module circuits can be used in combination with the reconfiguration apparatus of the present invention.

While in accordance with the provisions and statutes, it has been illustrated and described the best form of the invention known.

Having described the invention, what is claimed as new and novel and for which it is desired to secure Letters patent is:

1. A data processing system comprising:

a plurality of independently addressable memory modules;

a plurality of module positioning means, a first one of said positioning means being coupled to receive a predetermined set of input address signals, each of the remaining ones of said positioning means being coupled to receive input signals from a preceding positioning means, said each positioning means including means to modify said input signals to generate output address signals corresponding to a different logical address to be applied to a succeeding one of said positioning means and to the associated one of said modules;

error detecting means coupled to each of said memory modules for sensing a minimum standard of reliability for said memory modules, said error detecting means including checking means to generate a check error signal each time said detecting means senses that an accessed module has failed to meet said minimum standard indicating that said accessed module is faulty;

storage means coupled to said error detecting means, said storage means being conditioned by said checking means to store status signals indicating the occurrence of check error signal sensed during the accessing of any of said plurality of modules;

logic means coupled to said storage means, said logic means being operative in response to a command signal to apply inhibit control signals to the positioning means associated with modules having a check condition, the last mentioned positioning means being conditioned by said control signals to inhibit modifying said input signals so as to alter the generation of certain assigned logical addresses enabling all faulty memory modules to be disconnected and the reconfiguration of the remaining memory modules to provide a continuous addressable address space.

2. The system of claim 1 further including a plurality of module selection means, one individually coupled to each of said plurality of positioning means and to an associated one of said modules, each of said module selection means including means for receiving said output signals from the associated positioning means and a plurality of address signals coded to designate logical addresses of each of said plurality of memory modules selected for access and said logic means being individually coupled to each of said plurality of selection means, said logic means being operative to apply said control signals to the module selection means of each faulty module to inhibit access of each said module in response to said plurality of address signals.

3. The system of claim 1 wherein each of said positioning means includes input means for receiving said input address signals and output means for receiving said address signals generated by said positioning means corresponding to said logical address;

said positioning means of any one of said modules detected to be faulty being conditioned by said control signals to pass said input address signals to said output means unmodified and said address positioning means of each of the remaining modules being conditioned by said logic means to perform an arithmetic operation upon said input address signals and apply the results of said operation corresponding to said assigned logical address to said output means for application to the input means of a succeeding one of said plurality of positioning means.

4. The system of claim 1 further including:
a central processing unit, said central processing unit including means coupled to said error detecting means, said means being operative in response to said check error signal to generate said command signal initiating the reconfiguration of said remaining ones of plurality of memory modules.

5. The system of claim 2 wherein each of said positioning means includes an adder circuit, said adder circuit of each of said positioning means of said remaining ones of said memory modules being conditioned by said logic means to increment by one said input address signals and said adder circuit of said any one of said faulty modules being conditioned by said control signals to inhibit said adder circuit from incrementing by one said input address signals thereby enabling a succeeding one of said positioning means to assign the next sequential logical address to the memory module associated therewith.

6. The system of claim 1 wherein each of said plurality of memory modules includes a plurality of addressable storage locations and wherein said error detecting means includes:
error sensing means coupled to each of said plurality of addressable memory modules, said error sensing means includes module checking means operatively coupled to each of said plurality of memory modules, said means being operative to perform a checking operation upon the contents of a memory storage location of an accessed memory module and generate said check error signal when the contents of said accessed module are in error; and wherein
said storage means including a plurality of bistable storage means, each of said plurality of bistable storage means being operative to store a signal indicating the operational status of a different one of said memory modules in response to check error signals generated by said error sensing means, said plurality of bistable storage means being coupled to apply signals indicating said status of said plurality of memory modules to said logic means; and,
said logic means being responsive to said command signal and to said signals to inhibit each of said positioning means coupled to one of said bistable storage means which stores said signal that the module associated therewith is faulty, from modifying said input address signals.

7. The system of claim 6 wherein said module checking means of said error sensing means includes parity generation circuit means for signalling the occurrence of a parity error in said contents and wherein each of said plurality of bistable storage means are conditioned by said sensing means to be switched from a first state to a second state the first time the contents of a storage location of an accessed memory module is sensed as having a parity error.

8. The system of claim 6 wherein said logic means includes a plurality of bistable storage elements, one individually associated with each of said plurality of bistable storage means of said storage means, each of said plurality of bistable storage elements of said logic means being coupled to receive a signal from the associated one of said plurality of said bistable storage means and each of said plurality of bistable storage elements being coupled to the positioning means of one of said plurality of memory modules, each of said bistable storage elements being operative in response to said command signal to switch from a first state to a second state in accordance with the state of the associated bistable storage means.

9. The system of claim 7 wherein each of said plurality of bistable storage means of said storage means include means for receiving a clear signal, each of said plurality of storage devices switched to said second state being conditioned by said clear signal to switch from said second state to said first state thereby enabling said error detecting means to condition said storage means for storing signals indicating said sensing of subsequent check error signals.

10. The system of claim 7 further including a plurality of display indicator circuit means, each of said plurality of display indicator circuits being coupled to a different one of said plurality of bistable storage means of said error status means and each of said plurality of indicator circuits being conditioned by signals from said different one of said plurality of bistable storage means to display an indication of the status of the memory module associated therewith.

11. The system of claim 8 wherein each of said bistable storage elements of said logic means includes means for receiving a different one of a plurality of control signals, each of said bistable storage elements being operative in response to said control signal to switch from said first to said second state inhibiting corresponding ones of said address positioning means from altering said input signals and thereby enabling any one of said memory modules to be isolated for test purposes.

12. The system of claim 8 further including a central processing unit coupled to said error sensing means and to said bistable storage elements of said storage means, said central processing unit including means operative in response to said checking error signal to enter a predetermined error recovery program routine which results in the generation of said command signal so as to condition said plurality of address positioning means to cause the reconfiguration of said plurality of memory modules to form said continuous address space.

13. The system of claim 8 wherein each of said plurality of storage elements and each of said bistable storage means include means for receiving a clear control signal and wherein said system further includes a central processing unit coupled to said error sensing means and to said logic means, said central processing unit including means operative in response to said checking error signal to enter a predetermined error recovery program routine resulting in the conditioning of said central processing unit to generate said clear signal indicating that reconfiguration is not required.

14. The system of claim 11 further including a plurality of manually controlled switching means, each of said plurality of manually controlled switching means being coupled to a different one of said bistable storage elements and each of said switching means being connected to apply said differnt one of said control signals to said different one of said bistable storage elements.

15. The system of claim 11 further including manually controlled switching means coupled to said bistable storage elements of said storage means, said switching means being operative when switched to generate said command signal so as to condition said plurality of positioning means to cause a reconfiguration of said plurality of memory modules to form said continuous address space.

16. The system of claim 1 further including a plurality of module selection means, each of said module selection means being coupled to a different one of said positioning means and to a different one of said memory modules, and each of said plurality of module selection means including means for receiving a plurality of address signals coded to designate logical addresses of each of said plurality of memory modules selected for access and wherein each of said address positioning means includes:

adder circuit means including means for receiving said input address signals; and, comparison means coupled to said adder circuit means and including:

first input means for receiving a plurality of input signals representative of the maximum number of memory modules to be operative within the system, second input means for receiving said input address signals, and output circuit means for generating a control signal indicating when the maximum allowable address is exceeded, each of said adder circuit means being inhibited by said control signal from the associated comparison means from modifying said input address signals, the adder circuit means of a last one of said plurality of address positioning means being operative to generate output signals representative of the number of memory modules operating within the system, and, each of said module selection means being inhibited by said control signal from said comparison means from allowing access to said memory module when designated for access by said plurality of input address signals.

17. The system of claim 16 further including jumper circuit means connected to generate said input signals representative of said maximum number of memory modules operating within said system.

18. The system of claim 17 wherein said jumper circuit means are connected to generate input signals coded to specify maximum number less than said plurality of memory modules thereby providing a predetermined number of spare modules.

19. The system of claim 16 further including a central processing unit coupled to said last one of said plurality of positioning means, said central processing unit including:

comparison means having first input means for receiving address signals designating one of said plurality of modules specified for access, second input means for receiving said output signals, and output circuit means for generating a signal representing a non-existent memory error condition when said comparison means senses a true comparison between said signals applied to said first and second input means.

20. The system of claim 16 further including input jumper circuit means coupled to an adder circuit means of a first one of said plurality of positioning means, said input jumper means connected to generate input signals coded to represent one less than said lowest numerical assignable logical address.

21. The system of claim 20 wherein said lowest numerical address corresponds to an all zero code and wherein said highest numerical logical address corresponds to the number of operative memory modules.

22. A data processing system comprising:

a central processing means including means for generating a command signal; and, a memory system coupled to said central processing means, said memory system including a plurality of memory interfaces, each of said interfaces including:

a plurality of independently addressable memory modules, each connected in common to share a common input/output bus;

a plurality of positioning means, one individually associated with each of said plurality of memory modules and each one including:

input means for receiving input address signals, adder means coupled to receive said input address signals from said input means and operative to modify said input address signals to generate signals representative of an assigned logical address used to select for access the associated one of said memory modules, and output means coupled to receive said signals from said adder means;

a first one of said plurality of address positioning means being connected to receive initial predetermined address signals which are used to define the logical address of the module assigned the lowest numerical value, each of the remaining ones of said plurality of address positioning means being connected in tandem so that an adder circuit of each of said remaining ones of said positioning means is connected to receive input address signals from a preceding one of said remaining ones of said address positioning means and said adder circuit output means is connected to apply said logical address to a succeeding one of said remaining ones of said address positioning means;

error detecting means being operatively coupled to each of said memory modules of said interface, said error detecting means being operative to generate a check error signal each time said error detecting means senses that a memory module selected for access has performed a cycle of operation incorrectly indicating that the module accessed is faulty;

storage means coupled to said error detecting means, for storing indications of those modules selected for access indicated as being faulty; and, logic means coupled to said storage means and to each of said address positioning means, said logic means being operative in response to a command signal to generate signals indicating those memory modules selected for access which have been indicated as being faulty, the adder means of each faulty module being inhibited by said signals from altering the input address signals thereby changing the assignment of logical addresses so as to enable all faulty memory modules to be disconnected and the reconfiguration of the remaining ones of said plurality of memory modules to provide a continuous new address space.

23. The system of claim 22 including means for coupling said central processing means to a last one of said plurality of address positioning means included each of said plurality of memory interfaces for receiving signals representative of an assigned logical address having the highest numerical value and said last one of said plurality of address positioning means of each memory interface being conditioned by the address positioning means of said faulty modules to decrease said logical address having said highest numerical value by the number of faulty modules thereby indicating to said central processing means the remaining number of modules operating in each of said plurality of memory interfaces.

24. A memory system for use in a data processing system comprising:

a plurality of independently addressable memory modules;

a corresponding number of module select means, each of said module select means being coupled to a different one of said plurality of memory modules, each of said module select means including input means for receiving a plurality of address selection signals designating which of said plurality of memory modules has been addressed for access, and output means for generating signals for accessing said module;

error detection means operatively coupled to each of said plurality of memory modules, said error detection means including means for sensing a minimum standard of reliability for information accessed from said memory modules;

storage means coupled to said means for sensing for generating signals indicating when any one of said memory modules has failed to meet said minimum standard signalling that the module has failed;

reconfiguration logic means coupled to said storage means and to each of said memory module select means, said reconfiguration logic means including a plurality of address positioning means, one individually associated with each of said plurality of memory modules, a first one of said positioning means being coupled to receive a predetermined set of address signals, the remaining ones of said positioning means being coupled in tandem so that each positioning means receives input address from a preceding positioning means and said each positioning means being operative to modify said address signals and apply said modified address signals to a succeeding positioning means and to the select means of the associated module; and, purge logic means coupled to each of said plurality of address positioning means and to each of said number of module select means, said purge logic means coupled to said storage means, said purge logic means being operative in response to a command signal to apply signals to each of said plurality of address positioning means and to each of said selection means of any one of said memory modules specified by said signals from said storage means as having failed, said control signals conditioning said address positioning means from modifying the input address signals and conditioning the module selection means associated therewith from generating signals for accessing said module in response to said plurality of address selection signals.

25. In a data storage system including a plurality of independently addressable memory modules and a plurality of module select circuits, each being operative to select the associated memory module for access in response to a set of module address signals, a reconfiguration control system comprising:

a plurality of module positioning means, one individually associated with each of said plurality of module select circuits, a first one of said positioning means being connected to receive predetermined input address signals, the remaining ones of said positioning means being coupled in tandem so that each positioning means receives input address signals from a positioning means of a preceding module and applies modified address signals corresponding to a logical address as input to a positioning means of a succeeding module and to said one select circuit;

checking means connected to be accessible to each of said memory modules, said checking means being operative to detect a check condition by performing checking operation upon the information bits accessed from a module selected in response to said set of module address signals;

a plurality of storage means coupled to said checking means, one individually associated with each memory module and arranged to store a signal indicating the occurrence of a check condition within said associated module when detected by said checking means; and, logic means coupled to said plurality of storage means and said plurality of module positioning means, said logic means including means for receiving a control signal, said logic means being operative in response to said control signal to apply signals to the select circuits and positioning means associated with each of said plurality of storage means indicating said check condition, said last mentioned select circuits being conditioned by said signals to inhibit access to the associated modules and said last mentioned positioning means being conditioned by said signals to inhibit modifying said input signals thereby altering the assignment of logical addresses providing a reconfiguration of the remaining modules thereby forming a new continuous address space.

* * * * *

UNITED STATES PATENT OFFICE
CERTIFICATE OF CORRECTION

Patent No. 3,803,560 Dated April 9, 1974

Inventor(s) David D. DeVoy et al

It is certified that error appears in the above-identified patent and that said Letters Patent are hereby corrected as shown below:

Column 5, line 8, delete "24-1" and insert --29-1--.

Column 6, line 22, delete "MTMRT1B" and insert --MTMRT1A--.

Column 6, line 23, delete "MTMRT1B" and insert --MTMRT1A--.

Column 6, line 30, delete "MTMRT1B" and insert --MTMRT1A--.

Column 6, line 43, delete "MTDLB3C" and insert --MTDLB2C--.

Column 7, line 14, delete "A through D" and insert --1 through 4--.

Column 7, line 40, delete "3d" and insert --2d--.

Column 7, line 61, delete "3c" and insert --2c--.

Column 9, line 66, delete "M4AD4ØØ" and insert --M1AD4ØØ--.

Column 10, line 18, delete "M10FL3Ø" and insert --M10FL1Ø--.

Column 10, line 23, delete "M10FL3Ø" and insert --M10FL1Ø--.

Column 10, line 47, delete "M20FL3Ø" and insert --M20FL1Ø--.

Column 10, line 64, delete "M30FL3Ø" and insert --M30FL1Ø--.

UNITED STATES PATENT OFFICE

CERTIFICATE OF CORRECTION

Patent No. 3,803,560 Dated April 9, 1974

Inventor(s) David D. DeVoy et al

It is certified that error appears in the above-identified patent and that said Letters Patent are hereby corrected as shown below:

Column 11, line 12, delete "M40FL3Ø" and insert --M40FL1Ø--.

Column 11, line 15, delete "M40FL3Ø" and insert --M40FL1Ø--.

Column 16, line 2, delete "2h" and insert --2g--.

Column 16, line 12, delete "HBMA01Ø" and insert --HPBMA1Ø--.

Signed and sealed this 4th day of February 1975.

(SEAL)
Attest:

McCOY M. GIBSON JR.
Attesting Officer

C. MARSHALL DANN
Commissioner of Patents